US012646202B2

(12) United States Patent
Balasubramanian et al.

(10) Patent No.: US 12,646,202 B2
(45) Date of Patent: Jun. 2, 2026

(54) ESTIMATING RELATIVE POSE LEVERAGING LANE MARKERS

(71) Applicant: QUALCOMM Incorporated, San Diego, CA (US)

(72) Inventors: Anantharaman Balasubramanian, San Diego, CA (US); Kapil Gulati, Belle Mead, NJ (US); Jubin Jose, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 18/082,860

(22) Filed: Dec. 16, 2022

(65) Prior Publication Data

US 2024/0202965 A1     Jun. 20, 2024

(51) Int. Cl.
  *G06T 7/73*       (2017.01)
  *G06V 10/77*      (2022.01)
  *G06V 20/58*      (2022.01)

(52) U.S. Cl.
  CPC ........... *G06T 7/73* (2017.01); *G06V 10/7715* (2022.01); *G06V 20/58* (2022.01); *G06T 2207/30256* (2013.01)

(58) Field of Classification Search
  CPC ............. G06T 7/73; G06T 2207/30256; G06T 2207/30252; G06V 10/7715; G06V 20/58; G06V 10/46; G06V 10/764; G06V 20/54; G06V 20/588; H04W 4/46
  See application file for complete search history.

(56) References Cited

U.S. PATENT DOCUMENTS

| | | | |
|---|---|---|---|
| 2020/0257308 A1* | 8/2020 | Herman ............... | G05D 1/0231 |
| 2021/0118180 A1* | 4/2021 | Zamora Esquivel ..... | G06T 7/74 |
| 2022/0076441 A1* | 3/2022 | Chakravarty ............. | G06T 7/33 |
| 2024/0095960 A1* | 3/2024 | Qian ..................... | G01S 7/4972 |

OTHER PUBLICATIONS

Lourakis et al., "Matching disparate views of planar surfaces using projective invariants", Image and Vision Computing 18 (2000) 673-683 (Year: 2000).*

(Continued)

*Primary Examiner* — Vu Le
*Assistant Examiner* — Rachel Anne Ometz
(74) *Attorney, Agent, or Firm* — Loza & Loza, LLP

(57) ABSTRACT

Aspects relate to techniques for estimating relative pose leveraging lane markers. A first wireless communication device may receive a message from a second wireless communication device including a plurality of visual features (e.g., keypoints) of an image captured by the second wireless communication device, lane features identifying two (or more) traffic lane markers, and respective two-point two-line (2L2P) metrics for pairs of keypoints based on the traffic lane markers. The first wireless communication device may then obtain additional features from an additional image captured by the first wireless communication device and identify matching keypoints of the additional features for which the respective 2L2P metrics are satisfied. The first wireless communication device may then calculate a relative pose of the first wireless communication device with respect to the second wireless communication device based on the matching features.

13 Claims, 15 Drawing Sheets

(56) References Cited

OTHER PUBLICATIONS

Birk A., et al., "Merging Occupancy Grid Maps From Multiple Robots", Proceedings of the IEEE, New York, US, vol. 94, No. 7, Jul. 1, 2006, pp. 1384-1397, XP011370697, ISSN: 0018-9219, DOI: 10.1109/JPROC.2006.876965, section II.

Bresson G., et al., "Simultaneous Localization and Mapping: A Survey of Current Trends in Autonomous Driving", IEEE Transactions on Intelligent Vehicles, vol. 2, No. 3, Sep. 1, 2017, 28 Pages, XP011672646, Section V.B.

Dedeoglu G., et al., "Landmark-based Matching Algorithm for Cooperative Mapping by Autonomous Robots", CMU School of Computer Science, Dec. 31, 2000, 10 Pages, XP093124482, sections 2 and 3.

International Search Report and Written Opinion—PCT/US2023/080980—ISA/EPO—Feb. 8, 2024.

Li H., et al., "Multi-vehicle Cooperative Localization Using Indirect Vehicle-to-vehicle Relative Pose Estimation", 2012 IEEE International Conference on Vehicular Electronics and Safety, Jul. 27, 2012, 6 Pages, XP093124445, sections II and III.

* cited by examiner

White ——————

Yellow ——————

1300

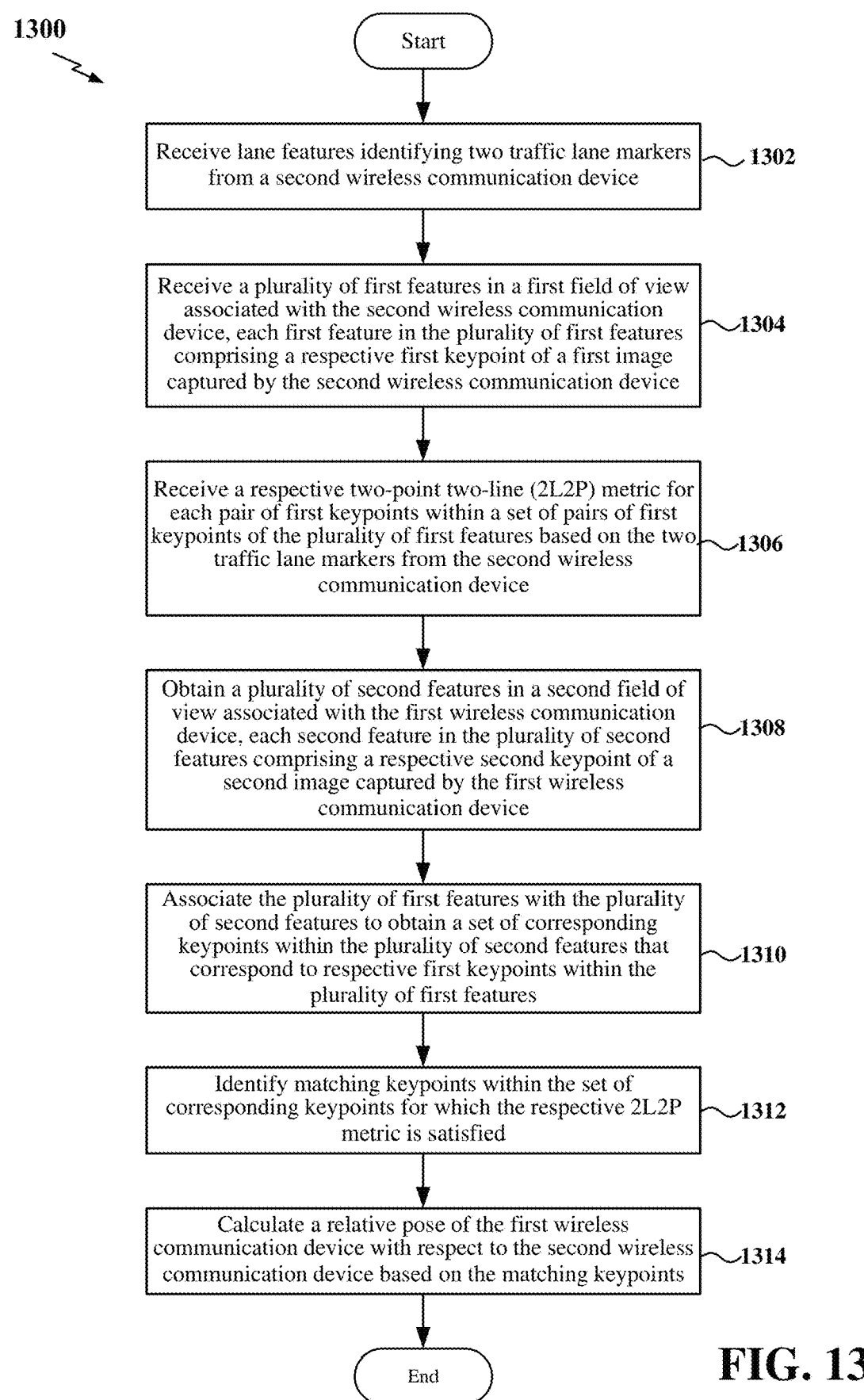

Start

Receive lane features identifying two traffic lane markers from a second wireless communication device ~1302

Receive a plurality of first features in a first field of view associated with the second wireless communication device, each first feature in the plurality of first features comprising a respective first keypoint of a first image captured by the second wireless communication device ~1304

Receive a respective two-point two-line (2L2P) metric for each pair of first keypoints within a set of pairs of first keypoints of the plurality of first features based on the two traffic lane markers from the second wireless communication device ~1306

Obtain a plurality of second features in a second field of view associated with the first wireless communication device, each second feature in the plurality of second features comprising a respective second keypoint of a second image captured by the first wireless communication device ~1308

Associate the plurality of first features with the plurality of second features to obtain a set of corresponding keypoints within the plurality of second features that correspond to respective first keypoints within the plurality of first features ~1310

Identify matching keypoints within the set of corresponding keypoints for which the respective 2L2P metric is satisfied ~1312

Calculate a relative pose of the first wireless communication device with respect to the second wireless communication device based on the matching keypoints ~1314

End

FIG. 13

ESTIMATING RELATIVE POSE LEVERAGING LANE MARKERS

TECHNICAL FIELD

The technology discussed below relates generally to wireless communication networks, and more particularly, to relative pose determination between wireless communication devices.

BACKGROUND

Visual odometry may be used in various applications, such as automotive applications. Visual odometry generally involves comparing consecutive image frames (e.g., in a video sequence) to infer the trajectory and pose of an object, such as a vehicle. The pose refers to the translation of the vehicle (e.g., geometrical movement of the vehicle in two or three dimensions) and orientation/rotation of the vehicle (e.g., pitch, yaw, roll). Visual odometry may be used, for example, in Advanced Driver-Assistance Systems (ADAS) applications to determine the vehicle pose for collision avoidance, cooperative driving, and/or other vehicular safety features.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device is disclosed including a transceiver, a memory, and a processor coupled to the transceiver and the memory. The processor is configured to receive lane features identifying two traffic lane markers from a second wireless communication device via the transceiver and receive a plurality of first features in a first field of view associated with the second wireless communication device via the transceiver. Each first feature in the plurality of first features includes a respective first keypoint of a first image captured by the second wireless communication device. The processor is further configured to receive a respective two-point two-line (2L2P) metric for each pair of first keypoints within a set of pairs of first keypoints of the plurality of first features based on the two traffic lane markers from the second wireless communication device via the transceiver and obtain a plurality of second features in a second field of view associated with the first wireless communication device. Each second feature in the plurality of second features includes a respective second keypoint of a second image captured by the first wireless communication device. The processor is further configured to associate the plurality of first features with the plurality of second features to obtain a set of corresponding keypoints within the plurality of second features that correspond to respective first keypoints within the plurality of first features, identify matching keypoints within the set of corresponding keypoints for which the respective 2L2P metric is satisfied, and calculate a relative pose of the first wireless communication device with respect to the second wireless communication device based on the matching keypoints.

Another example provides a method operable at a first wireless communication device. The method includes receiving lane features identifying two traffic lane markers from a second wireless communication device and receiving a plurality of first features in a first field of view associated with the second wireless communication device. Each first feature in the plurality of first features includes a respective first keypoint of a first image captured by the second wireless communication device. The method further includes receiving a respective two-point two-line (2L2P) metric for each pair of first keypoints within a set of pairs of first keypoints of the plurality of first features based on the two traffic lane markers from the second wireless communication device and obtaining a plurality of second features in a second field of view associated with the first wireless communication device. Each second feature in the plurality of second features includes a respective second keypoint of a second image captured by the first wireless communication device. The method further includes associating the plurality of first features with the plurality of second features to obtain a set of corresponding keypoints within the plurality of second features that correspond to respective first keypoints within the plurality of first features, identifying matching keypoints within the set of corresponding keypoints for which the respective 2L2P metric is satisfied, and calculating a relative pose of the first wireless communication device with respect to the second wireless communication device based on the matching keypoints.

Another example provides a wireless communication device including a transceiver, a memory, and a processor coupled to the transceiver and the memory. The processor is configured to transmit lane features identifying two traffic lane markers to at least one other wireless communication device via the transceiver and transmit a plurality of features in a field of view associated with the wireless communication device via the transceiver. Each feature in the plurality of features includes a respective keypoint of an image captured by the wireless communication device. The processor is further configured to transmit a respective two-point two-line (2L2P) metric for each pair of keypoints within a set of pairs of keypoints of the plurality of features based on the two traffic lane markers via the transceiver.

Another example provides a method operable at a wireless communication device. The method includes transmitting lane features identifying two traffic lane markers to at least one other wireless communication device and transmitting a plurality of features in a field of view associated with the wireless communication device. Each feature in the plurality of features includes a respective keypoint of an image captured by the wireless communication device. The method further includes transmitting a respective two-point two-line (2L2P) metric for each pair of keypoints within a set of pairs of keypoints of the plurality of features based on the two traffic lane markers.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIG. 13 is a flow chart of an exemplary process for relative pose determination leveraging lane markers according to some aspects.

DETAILED DESCRIPTION

Figure 1:
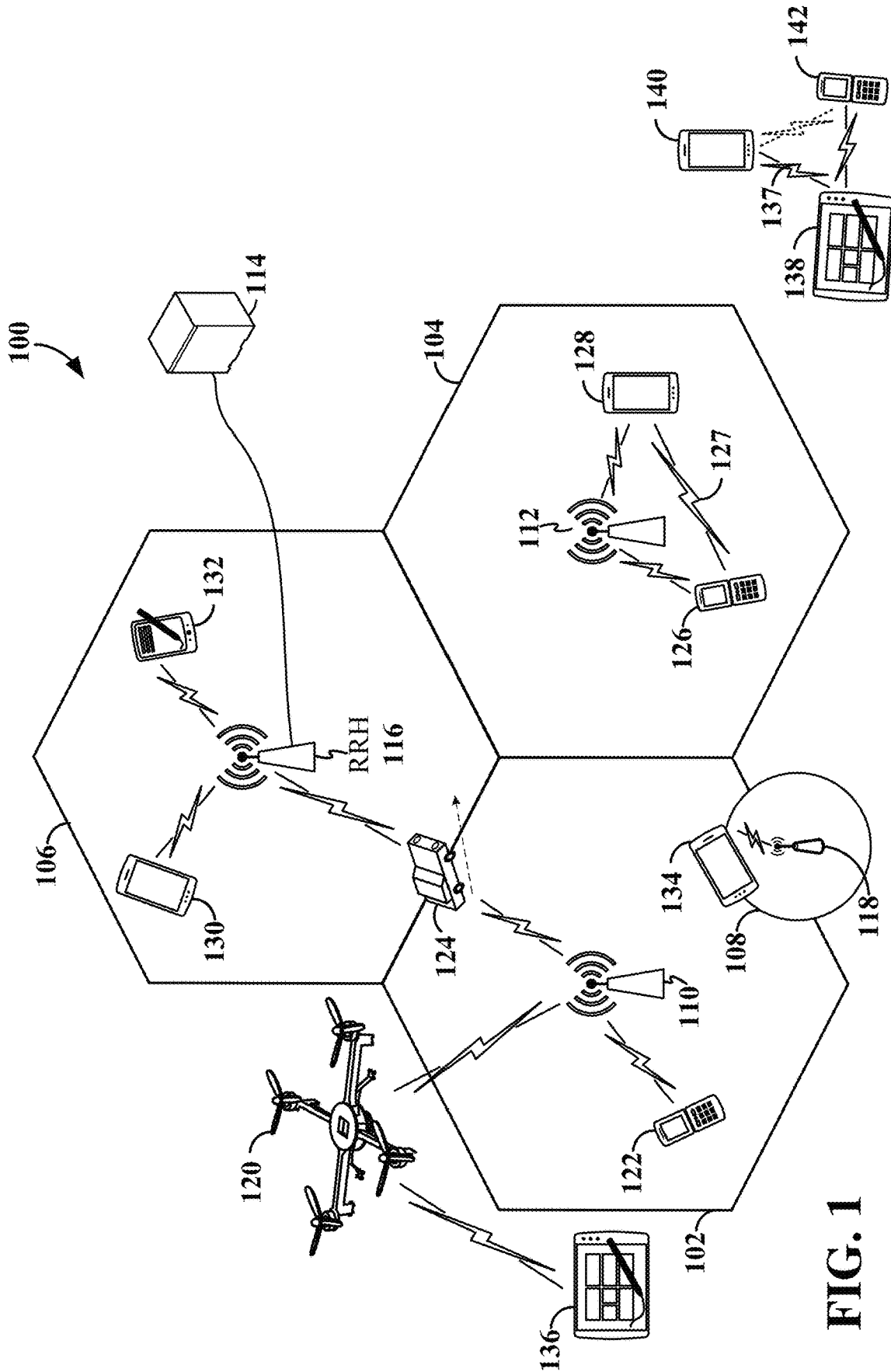
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Mobile devices equipped with a camera may be capable of determining the two-dimensional or three-dimensional displacement of the camera over time. For example, in automotive applications, visual odometry may be used to estimate the trajectory and pose of the vehicle. For some applications, such as Advanced Driver-Assistance Systems (ADAS), high accuracy in relative vehicle pose determination (e.g., relative to another vehicle or object) may improve reaction time to lane changes, collision avoidance, and/or cooperative driving. Without highly accurate relative pose determination, ADAS systems may bias that vehicles are going straight in their lanes, which increases the reaction time of the ADAS system to react to a lane change. The high accuracy requirements of ADAS systems may not be met using only the on-board camera to determine the relative vehicle pose due to the delay between image captures and field of view restrictions.

To decrease the time to obtain a relative vehicle pose and to improve the accuracy of relative vehicle pose calculations, visual feature sharing between wireless communication devices may be performed to enable determination of the relative pose between the wireless communication devices. A first wireless communication device may transmit a request for visual feature sharing to a second wireless communication device and in response receive a message from the second wireless communication device including a plurality of features (e.g., first features) within a field of view (e.g., a first field of view) associated with the second wireless communication device. Each first feature may include a respective first keypoint of a first image captured by the second wireless communication device.

The first wireless communication device may then obtain a plurality of second features in a second field of view associated with the first wireless communication device. Each second feature may also include a respective second keypoint of a second image captured by the first wireless communication device. The first wireless communication device may calculate a relative pose of the first wireless communication device with respect to the second wireless communication device based on an association between the plurality of first features and the plurality of second features.

In some examples, each feature (first feature and second feature) may further include a feature descriptor corresponding to the respective feature. The first wireless communication device may then calculate the relative pose by associating the first plurality of features with the second plurality of features based on the first/second keypoints and corresponding first/second feature descriptors.

To reduce the number of visual features shared with the second wireless communication device and/or to enable the relative pose to be calculated in minimal texture environments that include a relatively low number of distinct objects in the vicinity of the wireless communication devices, in various aspects of the disclosure, traffic lane markers on roads traveled by the wireless communication device may be leveraged and used in conjunction with a reduced number of keypoints to obtain the relative pose between wireless communication devices. For example, the second wireless communication device may transmit lane features identifying traffic lane markers, along with a plurality of first features (e.g., first keypoints) to the second wireless communication device. For example, the plurality of first features provided by the second wireless communication device may include a subset of a larger set of first features obtained by the second wireless communication device in order to reduce overhead. In other examples, the plurality of first features may include all or a substantial portion of the visual features obtained in a low texture environment. To utilize the lane markers and visual features to determine the relative pose, the second wireless communication device may further transmit two-line two-point (2L2P) metrics to the first wireless communication device.

The first wireless communication device may associate the plurality of first features with the plurality of second features to obtain a set of corresponding keypoints within the plurality of second features that correspond to respective first keypoints within the plurality of first features. The first wireless communication may then identify matching keypoints within the set of corresponding keypoints for which the respective 2L2P metric is satisfied and calculate the relative pose based on the matching keypoints.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station. A base station may further be implemented in an aggregated or a disaggregated architecture.

Various base station arrangements can be utilized. For example, in FIG. 1, base stations 110, 112, and 146 are shown in cells 102, 104, and 142; and another base station 114 is shown controlling a remote radio head (RRH) 116 in cell 106. That is, a base station can have an integrated antenna or can be connected to an antenna or RRH by feeder cables. In the illustrated example, the cells 102, 104, 106, and 142 may be referred to as macrocells, as the base stations 110, 112, 114, and 146 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118, and 146 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 via RRH 116; UEs 138 and 140 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as sub-band full duplex (SBFD), also known as flexible duplex (FD).

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ –7.125 GHz) and FR2 (24.25 GHz-52.6 GHz). It should be understood that although a portion of FR 1 is greater than 6 GHz, FR 1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHZ-71 GHz), FR4 (52.6 GHZ –114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). For example, two or more UEs (e.g., UEs 138 and 140) may communicate with each other using peer to peer (P2P) or sidelink signals 137 without relaying that communication through a base station (e.g., base station 146). In some examples, the UEs 138 and 140 may each function as a scheduling entity or transmitting sidelink device and/or a scheduled entity or a receiving sidelink device to communicate sidelink signals 137 therebetween without relying on scheduling or control information from a base station (e.g., base station 146). In other examples, the base station 146 may allocate resources to the UEs 138 and 140 for sidelink communication. For example, the UEs 138 and 140 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the base station 112 via D2D links (e.g., sidelink 137). For example, one or more UEs (e.g., UE 138) within the coverage area of the base station 146 may operate as a relaying UE to extend the coverage of the base station 146, improve the transmission reliability to one or more UEs (e.g., UE 140), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
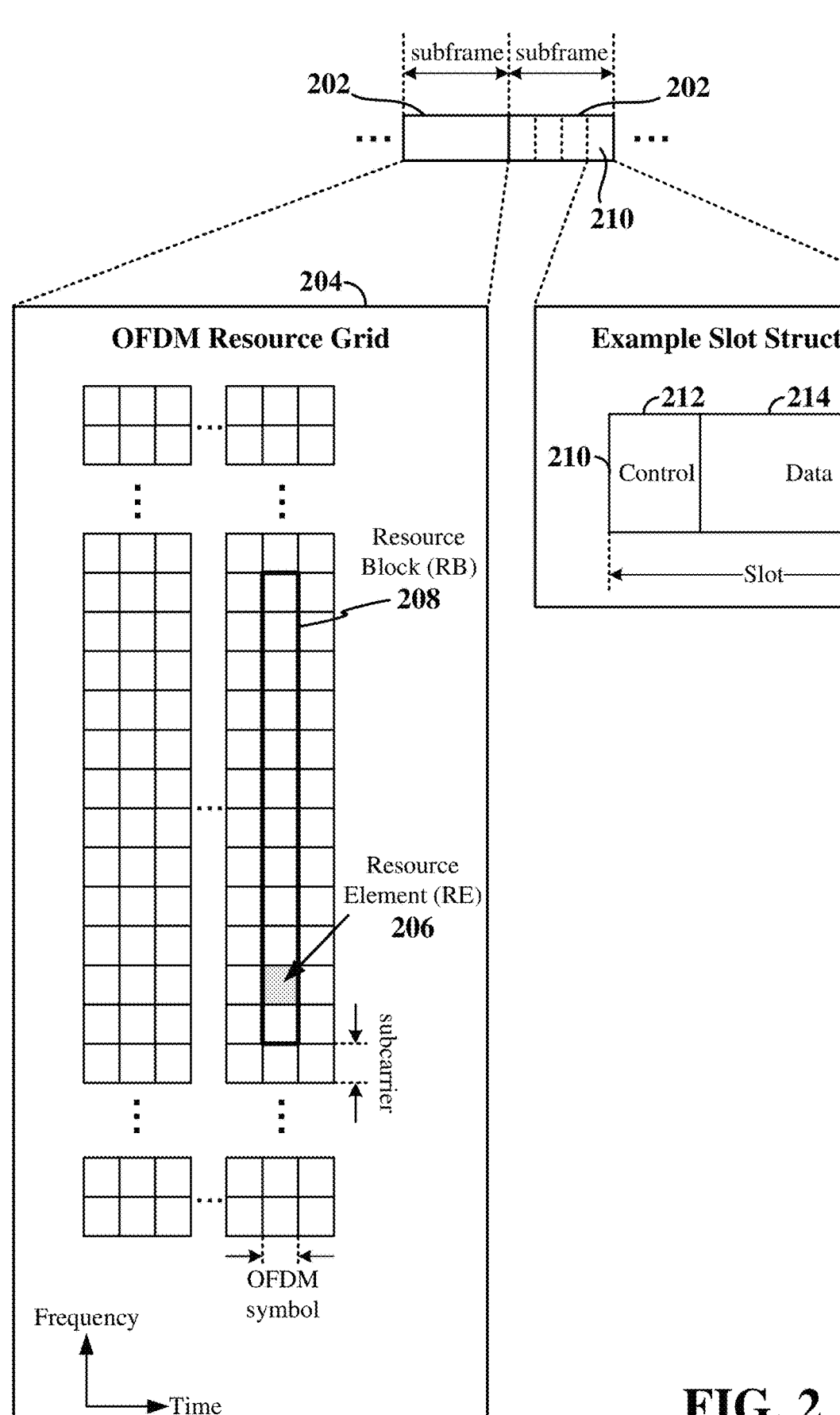
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control signal (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
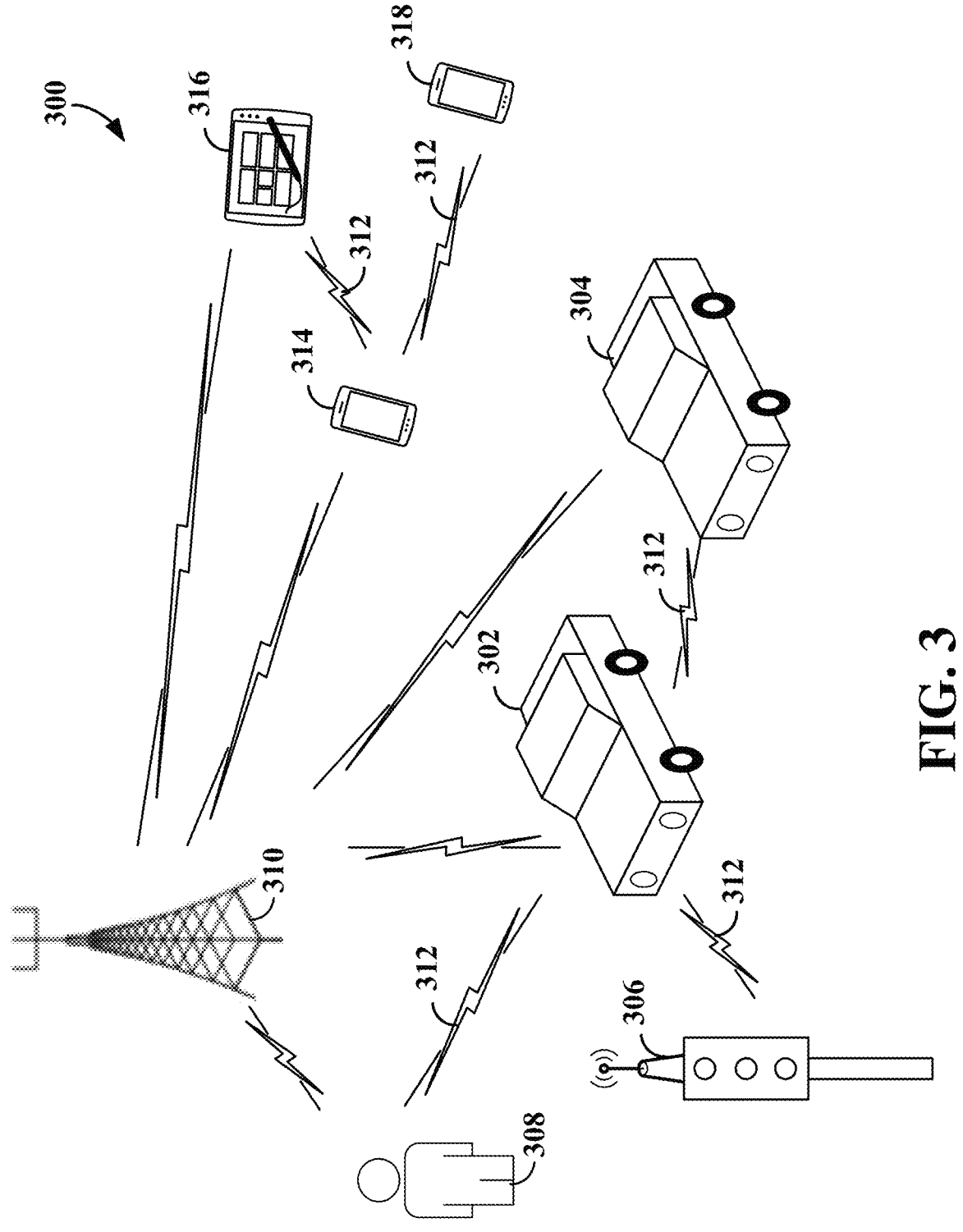
FIG. 3 is a diagram illustrating an example of a wireless communication network employing sidelink communication according to some aspects.

FIG. 3 illustrates an example of a wireless communication network 300 configured to support sidelink communication. In some examples, sidelink communication may include D2D or V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., network entity 310). The network entity 310 may further be implemented in an aggregated or monolithic base station architecture, or in a disaggregated base station architecture. In addition, the network entity 310 may be a stationary network entity or a mobile network entity. In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314, 316, and 318.

ProSe communication may support different operational scenarios, such as in-coverage, out-of-coverage, and partial coverage. Out-of-coverage refers to a scenario in which UEs (e.g., UEs 314 and 316) are outside of the coverage area of a network entity (e.g., network entity 310), but each are still configured for ProSe communication. Partial coverage refers to a scenario in which some of the UEs (e.g., V-UE 304) are outside of the coverage area of the network entity 310, while other UEs (e.g., V-UE 302 and P-UE 308) are in communication with the network entity 310. In-coverage refers to a scenario in which UEs (e.g., V-UE 302 and P-UE 308) are in communication with the network entity 310 (e.g., gNB) via a Uu (e.g., cellular interface) connection to receive ProSe service authorization and provisioning information to support ProSe operations.

In some examples, a UE (e.g., UE 318) may not have a Uu connection with the network entity 310. In this example, a D3D relay link (over sidelink 312) may be established between UE 318 and UE 314 to relay communication between the UE 318 and the network entity 310. The relay link may utilize decode and forward (DF) relaying, amplify and forward (AF) relaying, or compress and forward (CF) relaying. For DF relaying, HARQ feedback may be provided from the receiving device to the transmitting device. The sidelink communication over the relay link may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications. The relay link between UE 314 and UE 318 may be established due to, for example, distance or signal blocking between the network entity 310 and the UE 318, weak receiving capability of the UE 318, low transmission power of the UE 318, limited battery capacity of the UE 318, and/or to improve link diversity. Thus, the relay link may enable communication between the network entity 310 and UE 318 to be relayed via one or more relay UEs (e.g., UE 314) over a Uu wireless communication link and relay link(s) (e.g., between UE 314 and UE 318). In other examples, a relay link may enable sidelink communication to be relayed between a UE (e.g., UE 318) and another UE (e.g., UE 316) over various relay links (e.g., relay links between UEs 314 and 316 and between UEs 314 and 318).

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In some examples, a common carrier may be shared between the sidelinks 312 and Uu links, such that resources on the common carrier may be allocated for both sidelink communication between UEs (e.g., UEs 302, 304, 307, 308, 314, 316, and 318) and cellular communication (e.g., uplink and downlink communication) between the UEs (e.g., UEs 302, 304, 306, 308, 314, 316, and 318) and the network entity 310. In 5G NR sidelink, sidelink communication may utilize transmission or reception resource pools. For example, the minimum resource allocation unit in frequency may be a sub-channel, which may include, for example, 10, 15, 20, 25, 50, 75, or 100 consecutive RBs, and the minimum resource allocation unit in time may be one slot. The number of sub-channels in a resource pool may include between one and twenty-seven. The configuration of the resource pool (RP) utilized between two sidelink devices for communication therebetween may be either pre-configured (e.g., a factory setting on the UE determined, for example, by sidelink standards or specifications) or provided by a network entity (e.g., network entity 310).

In addition, there may be two main resource allocation modes of operation for sidelink (e.g., PC5) communications. In a first mode, Mode 1, a network entity (e.g., gNB) 310 may allocate resources to sidelink devices (e.g., V2X devices or other sidelink devices) for sidelink communication between the sidelink devices in various manners. For example, the network entity 310 may allocate sidelink resources dynamically (e.g., a dynamic grant) to sidelink devices, in response to requests for sidelink resources from the sidelink devices. For example, the network entity 310 may schedule the sidelink communication via DCI 3_0. In some examples, the network entity 310 may schedule the PSCCH/PSSCH within uplink resources indicated in DCI 3_0. The network entity 310 may further activate preconfigured sidelink grants (e.g., configured grants) for sidelink communication among the sidelink devices. In some examples, the network entity 310 may activate a configured grant (CG) via RRC signaling. In Mode 1, sidelink feedback may be reported back to the network entity 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QOS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of resources reserved for one or more retransmissions of the sidelink transmission (e.g., the sidelink traffic/data) or for one or more additional (new) sidelink transmissions. Thus, the SCI may include a respective PSSCH resource reservation and assignment for one or more PSSCH transmissions. For example, the SCI may include a reservation message indicating the PSSCH resource reservation for the initial sidelink transmission (initial PSSCH) and one or more additional PSSCH resource reservations for one or more retransmissions of the PSSCH.

Figures 4A, 4B:
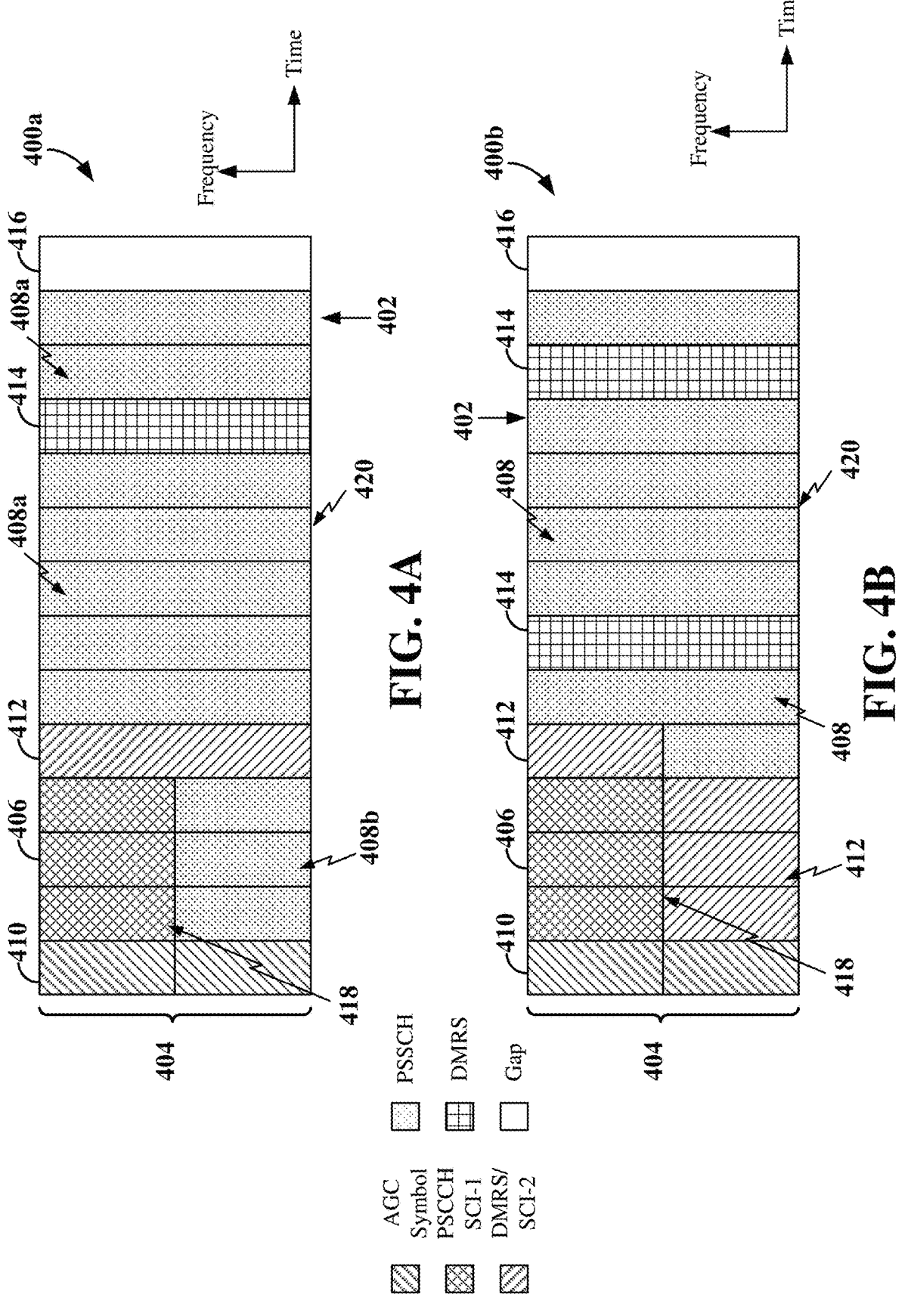
FIGS. 4A and 4B are diagrams illustrating examples of sidelink slot structures according to some aspects.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 (e.g., SCI format 1-A) that schedules transmission of data traffic (e.g., a packet) on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Visual odometry may be used in sidelink (e.g., V2X) applications to estimate the trajectory and pose of a wireless communication device (e.g., a V2X device, such as a vehicle). The pose refers to the translation of the vehicle (e.g., geometrical change in the position of the vehicle in two or three dimensions) and orientation/rotation of the vehicle (e.g., pitch, yaw, roll). Visual odometry involves comparing consecutive image frames (e.g., in a video sequence) to infer the trajectory of the vehicle. For example, the two-dimensional displacement of five or more stationary keypoints detected and tracked across two camera images is sufficient to recover the three-dimensional displacement of the camera up to a global scale factor. In some examples, the vehicle may include an aiding sensor, such as an inertial measurement unit (IMU), to determine the displacement on a global scale.

Figure 5:
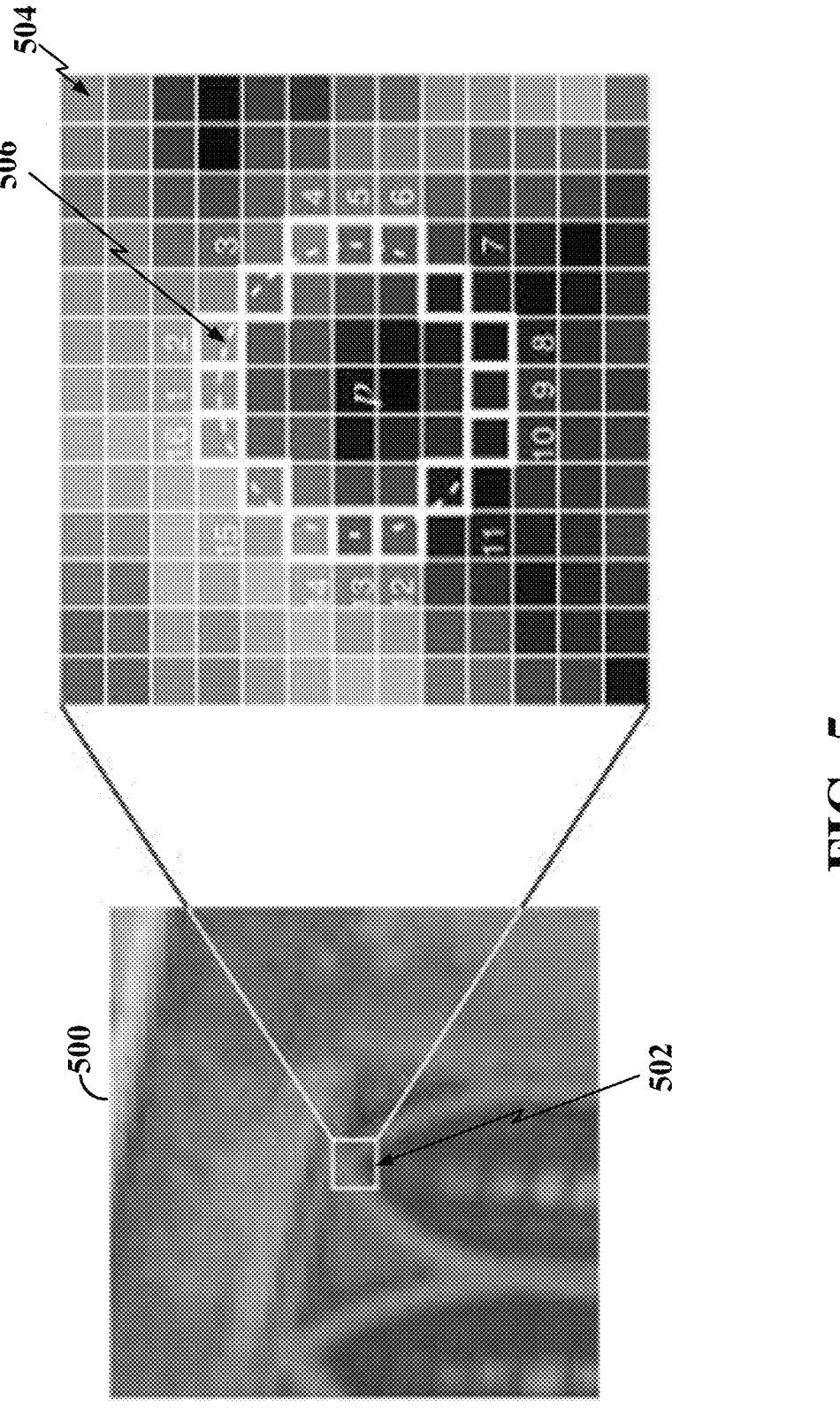
FIG. 5 is a diagram illustrating an example of an image including a keypoint according to some aspects.

FIG. 5 is a diagram illustrating an example of an image 500 including a keypoint 502 according to some aspects. As used herein, the term keypoint 502 refers to a group of pixels 504 in the image 500 that can be tracked from image frame to image frame, such as a corner point on an object. One example of a corner detection method shown in FIG. 5 is the features from accelerated segment test (FAST) (Machine Learning for High-Speed Corner Detection, Edward Rosten & Tom Drummond, ECCV 2006: Computer Vision Vision-ECCV 2006 pp 430-443, Part of the Lecture Notes in Computer Science book series (LNIP,volume 3951)). In the FAST method, a pixel 504 under test p with intensity Ip may be identified as an interest point. A circle of sixteen pixels (pixels 1-16) around the pixel under test (e.g., a Bresenham circle of radius 3) may then be identified. The pixel p may be considered a corner point if there exists a set of n contiguous pixels in the circle of sixteen pixels that are all brighter than Ip+t, or all darker than Ip−t, where t is a threshold value and n is configurable. In this example, n may be twelve. For example, the intensity of pixels 1, 5, 9, and 13 of the circle may be compared with Ip. If at least three of the four pixels do not satisfy the threshold criteria, the pixel p is not considered an interest point. As evident from FIG. 5, at least three of the four pixels satisfy the threshold criteria. Therefore, all sixteen pixels may be compared to pixel p to determine if twelve contiguous pixels meet the threshold criteria. This process may be repeated for each pixel 504 in the image 500 to identify the corner points corresponding to keypoints 502 in the image 500.

Although FIG. 5 illustrates a FAST keypoint identifying method, it should be understood that the present disclosure is applicable to any keypoint identifying method. Examples of keypoint identifying methods may include, but are not limited to, SIFT (scale-invariant feature transform), ORB (oriented FAST (features from accelerated segment test) and rotated BRIEF (binary robust independent elementary feature)), BRIEF, and Harris corner point.

As indicated above, a keypoint 502 represents a feature of an image 500 that may be tracked. For example, various cross-correlation or optical flow methods may track features (keypoints) across image frames. In some examples, each feature may further include a feature descriptor that assists with the tracking process. A feature descriptor may summarize, in vector format (e.g., of constant length) one or more characteristics of the keypoint 502. For example, the feature descriptor may correspond to the intensity of the keypoint 502. In general, feature descriptors are independent of the keypoint 502 position, robust against image transformations, and scale independently. Thus, keypoints with feature descriptors may be independently re-detected in each image frame and then subjected to a keypoint matching/tracking procedure. For example, the keypoints in two different images with matching descriptors and the smallest distance between them may be considered to be matching keypoints.

The pose of the camera may then be calculated based on the two-dimensional displacement of a plurality of keypoints in consecutive images. For example, the pose may be determined by forming and factoring an essential matrix using eight keypoints 502 or using Nister's method with five keypoints 502. As another example, a Perspective-n-Point (PnP) algorithm with three keypoints 502 may be used to determine the pose if keypoint depth is also being tracked.

Figure 6:
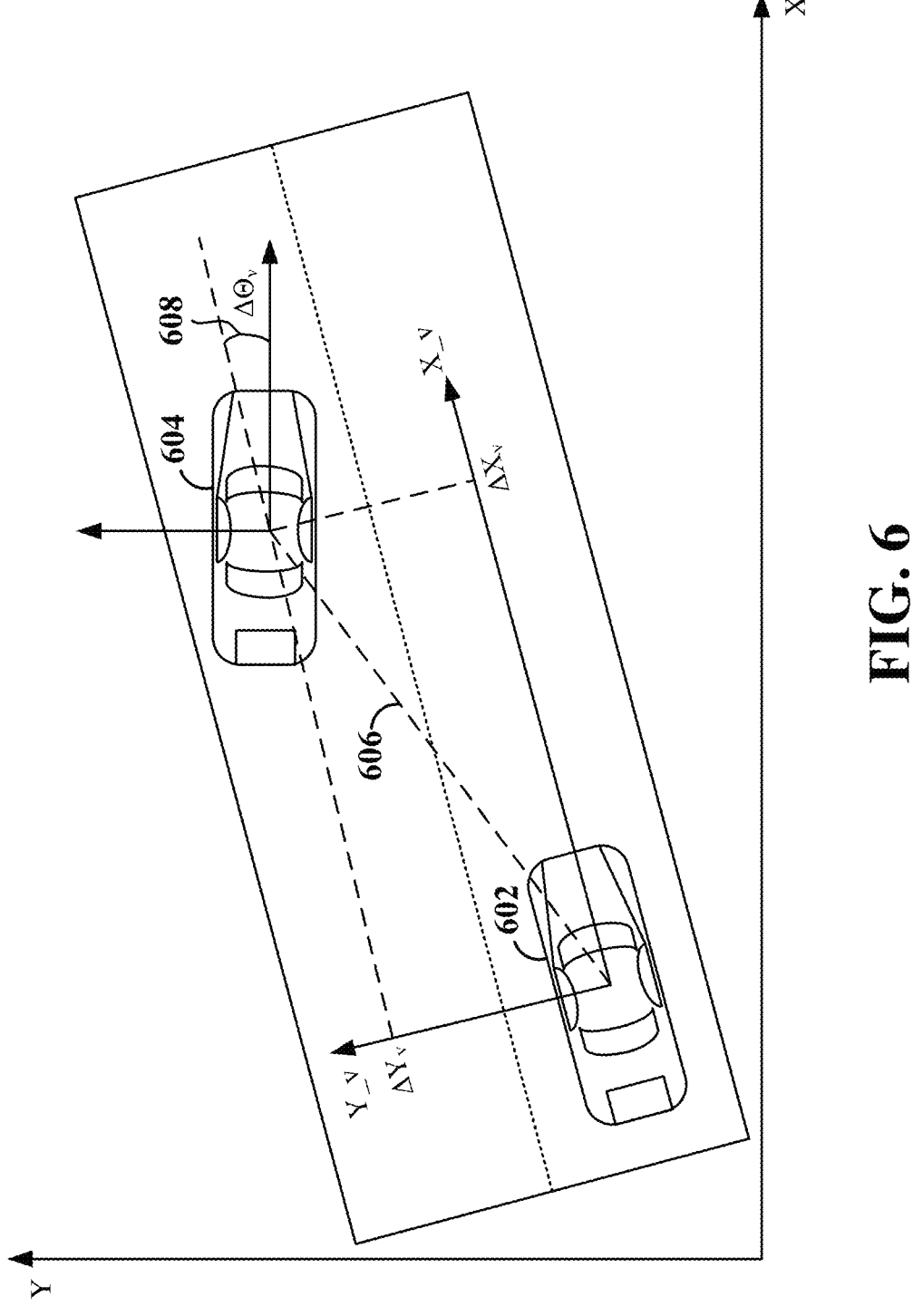
FIG. 6 is a diagram illustrating an example of relative pose determination between vehicles according to some aspects.

In some aspects, images captured by different cameras that contain a minimum number of the same features (e.g., based on the pose determination method) may be used to determine the relative pose between the cameras. FIG. 6 is a diagram illustrating an example of relative pose determination between vehicles 602 and 604 according to some aspects. In some examples, each of the vehicles 602 and 604 may be a wireless communication device, such as a V2X device including a sensor (e.g., a camera) for capturing images. In addition, the vehicles 602 and 604 may each be ego vehicles within an intelligent transportation system. The vehicles 602 and 604 are shown in a two-dimensional coordinate system represented by the X-axis and Y-axis. Thus, the pose of each vehicle 602 and 604 may be determined in the X, Y coordinate system.

In addition, the relative pose between the vehicles 602 and 604 may also be determined based on a rotated coordinate system centered at one of the vehicles (e.g., vehicle 602) represented by the X_v axis and Y_v axis. In some examples, the rotated coordinate system may be centered at a camera of the vehicle 602. The relative pose of vehicle 604 with respect to vehicle 602 may include a relative translation 606 of vehicle 604 in the X_v and Y_v directions corresponding to $\Delta X_v$ and $\Delta Y_v$. In addition, the relative pose of vehicle 604 with respect to vehicle 602 may include a relative orientation 608 of vehicle 604 corresponding to angle $\Delta\Theta_v$.

To facilitate relative pose determination, various aspects of the disclosure provide mechanisms for visual feature sharing between wireless communication devices (e.g., vehicles 602 and 604). For example, vehicle 604 may capture an image within a field of view of an on-board camera of vehicle 604 and identify a plurality of keypoints in the image using FAST, ORB, BRIEF, SIFT, Harris corner points or another keypoint detection algorithm. The vehicle 604 may then transmit the identified features (keypoints) to vehicle 602. The vehicle 602 may use the received keypoints from vehicle 604 and matching keypoints obtained from an image in the same or similar (e.g., a common) field of view captured by an on-board camera of vehicle 602 for relative pose determination between vehicle 602 and vehicle 604.

Figure 7:
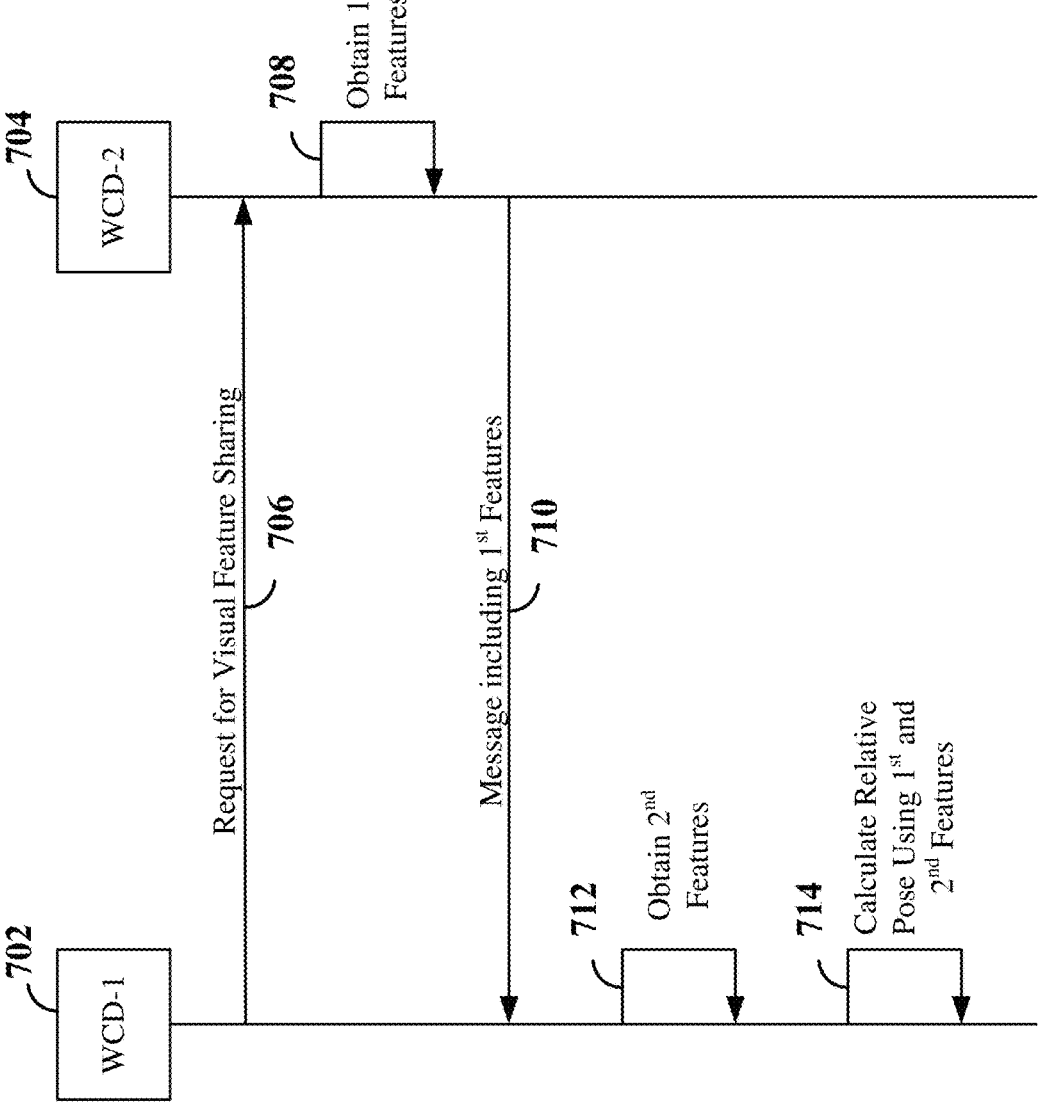
FIG. 7 is a diagram illustrating exemplary signaling between wireless communication devices for relative pose determination according to some aspects.

FIG. 7 is a diagram illustrating exemplary signaling between wireless communication devices (WCD-1 702 and WCD-2 704) for relative pose determination according to some aspects. Each of the WCD-1 702 and the WCD-2 704 may be, for example, a vehicle (e.g., an ego vehicle), a UE, a V2X device, or a sidelink device. The WCD-1 702 and the WCD-2 704 may be in the vicinity of one another. In some examples, the WCD-1 702 and WCD-2 704 may have established a sidelink therebetween (e.g., via discovery signals).

At 706, the WCD-1 702 may transmit a request for visual feature sharing to the WCD-2 704. For example, the WCD-1 702 may be unaware of its pose and may request the WCD-2 704 to provide keypoints to the WCD-1 702. In some examples, the WCD-1 702 may transmit a request to provide keypoints from multiple images obtained by the WCD-2 704 over time (e.g., at different time instants). In some examples, the request may indicate specific time instants (e.g., $t_1$, $t_2$, . . . , $t_p$) at which the images should be captured. In other examples, the WCD-1 702 may transmit multiple requests at different time instants, each requesting the WCD-2 704 to provide keypoints from one or more images.

In some examples, the request may include an indication of a visual field of view in which the keypoints are requested. For example, the field of view of the WCD-2 704 may be adjustable or the WCD-1 702 may transmit the request to multiple second WCDs and a second WCD (e.g., WCD-2 704) having the request field of view may respond to the request. In some examples, the indication may further include a coordinate system of the field of view. For example, the coordinate system may be a global coordinate system or other pre-configured coordinate system. Examples of global coordinate systems may include, but are not limited to LLA (Longitude, Latitude, Altitude) and ECEF (Earth-centered, Earth-fixed), also known as the Geocentric coordinate system. Thus, the request may request features within a field of view defined using a particular coordinate system. In other examples, the indication includes a differential value (e.g., +/−X degrees) with respect to a field of view of a previous set of features (e.g., keypoints) received from the WCD-2 704.

In some examples, the request may be transmitted via one or more of a unicast sidelink message, a multicast (or groupcast) sidelink message, or a broadcast sidelink message. In other examples, the request may be transmitted via a network entity (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) in wireless communication with the WCD-1 702 and WCD-2 704. For example, the request may be transmitted to the network entity via a Uu link between WCD-1 702 and the network entity and the network entity may transmit the request to the WCD-2 704 via a Uu link between the network entity and the WCD-2 704.

At 708, the WCD-2 704 may obtain a plurality of first features of a first image captured by the WCD-2 704 in a first field of view. The first field of view may be indicated in the request or may be based on the position of a sensor (e.g., camera) on the WCD-2 704 that captured the image. The WCD-2 704 may identify the plurality of first features in the first image using FAST, BRIEF, ORB, SIFT, Harris corner points or another keypoint detection algorithm. The WCD-2 704 may further determine (e.g., calculate) feature descriptors for each feature. In an example, the WCD-2 704 may obtain, at a first time instant $t_1$, an image I using its camera. The WCD-2 704 may then determine M key-point locations for image I to be $A=[(u_1, v_1), (u_2, v_2), . . . (u_M, v_M)]$ and corresponding features $F=[F_1, F_2, . . . F_M]$ using a keypoint detection algorithm.

At 710, the WCD-2 704 may transmit a message to the WCD-1 702 including the plurality of first features. In some examples, each of the first features may include a respective first keypoint. In other examples, each of the first features may include a respective first keypoint and corresponding first feature descriptor. The first feature descriptors may be SIFT, ORB, HOG (histogram of oriented gradients), GLOH (gradient location and orientation histogram), and/or SURF (speeded up robust features) feature descriptors. In an example, the message may include the M features for the image {F} and the corresponding pixel locations {A} of each of the features. In some examples, the message may further include a timestamp indicating a first time (time instant $t_1$) at which the plurality of first features were obtained.

In some examples, the message may be transmitted via one or more of a unicast sidelink message, a multicast (or groupcast) sidelink message, or a broadcast sidelink message. In other examples, the message may be transmitted via a network entity (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) in wireless communication with the WCD-1 702 and WCD-2 704. For example, the message may be transmitted to the network entity via a Uu link between WCD-2 704 and the network entity and the network entity may transmit the request to the WCD-1 702 via a Uu link between the network entity and the WCD-1 702.

At 712, the WCD-1 702 may obtain a plurality of second features of a second image captured by the WCD-1 702 in a second field of view. The second field of view and first field of view may include a common field of view. The WCD-1 702 may identify the plurality of second features in the second image using FAST, BRIEF, ORB, SIFT, Harris corner points or another keypoint detection algorithm. The WCD-1 702 may further determine (e.g., calculate) second feature descriptors for each feature. The second feature descriptors may be SIFT, ORB, HOG, GLOH, and/or SURF feature descriptors.

In an example, the WCD-1 702 may obtain, at a second time (e.g., second time instant $t_2$), an image Z using its camera. The second time instant $t_2$ may be near in time to the first time instant $t_1$. For example, the second time instant $t_2$ may be within a pre-configured duration (or threshold duration) from time instant $t_1$. In examples in which the second time instant $t_2$ is outside of the pre-configured duration (e.g., the time difference between $t_2$ and $t_1$ exceeds the threshold duration), the WCD-1 702 may not use the plurality of first features and may transmit a new request for visual feature sharing to the WCD-2 704 or the WCD-1 702 may use a subsequent set of features sent by the WCD-2 704 based on the original request transmitted at 706.

At 714, the WCD-1 702 may calculate the relative pose of the WCD-1 702 with respect to the WCD-2 704 based on an association between the plurality of first features and the plurality of second features. In an example, the WCD-1 702 may use the image L obtained from its camera at time $t_2$ and match the plurality of first features F obtained from the WCD-2 704 with the plurality of second features obtained from the image L to associate the first features with the second features. For example, the first features and second features may be matched using various cross-correlation or optical flow methods and/or feature descriptors. For example, the pixel locations at which the WCD-1 702 obtains a match for N features in L can be represented as B=[(p_1, q_1),(p_2, q_2), . . . (p_N,q_N)]. The WCD-1 702 may then determine the relative pose using an essential matrix, Nister's method, or a PnP algorithm.

Figure 8:
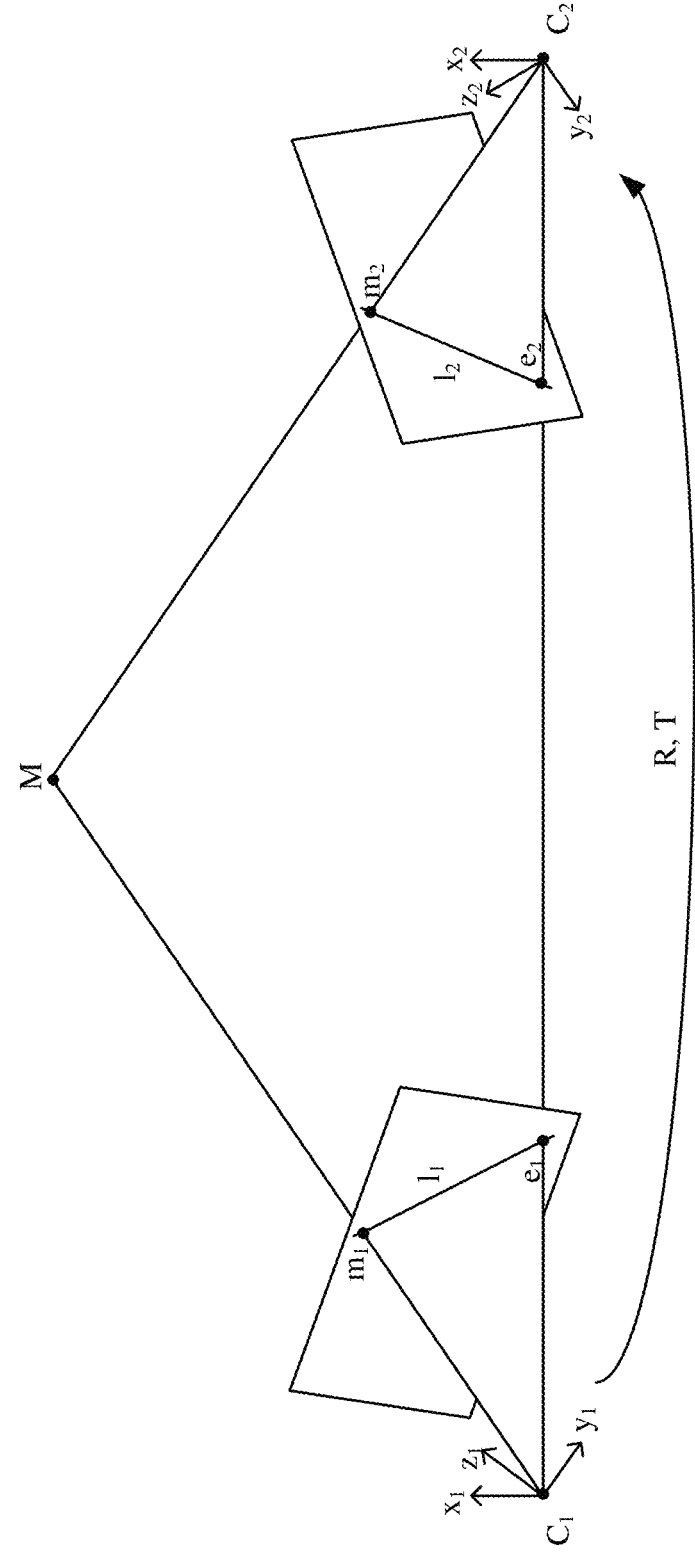
FIG. 8 is a diagram illustrating an example of relative pose determination using keypoints from images captured at different cameras according to some aspects.

FIG. 8 is a diagram illustrating an example of relative pose determination using keypoints from images captured at different cameras $C_1$ and $C_2$ according to some aspects. In the example shown in FIG. 8, each of the cameras $C_1$ and $C_2$ may be positioned on a different wireless communication device, such as a vehicle. A real point M in three-dimensional space (x, y, z) may be projected onto the respective image planes $I_1$ and $I_2$ of each of the vehicle cameras $C_1$ and $C_2$ to produce features (keypoints) $m_1$ and $m_2$. By correlating or associating (e.g., matching) multiple sets of features (e.g., corresponding to multiple real points), the epipolar constraint (e.g., line $l_1$ between $m_1$ and $e_1$ and line $l_2$ between $m_2$ and $e_2$) on the relative vehicle pose may be extracted. As a result, based on the keypoints of multiple real points and the epipolar constraint, a first wireless communication device associated with camera $C_1$ may determine the relative pose (Rotation (R), Translation (T)) of the first wireless communication device with respect to a second wireless communication device associated with camera $C_2$.

In some examples, a minimal number (e.g., between three and eight) correct matching features may be used to determine the relative pose. However, typically a few tens of corresponding matching points may be required to filter outliers, for example, using random sample consensus (RANSAC). In practice, in order to obtain enough matched features to determine the relative pose, several thousands of visual features (e.g., between 8-15 thousand visual features) may need to be shared between vehicles. Transmitting such a high number of visual features incurs communication overhead and may limit the potential of including visual features as part of Basic Safety Messages (BSMs) in V2X systems.

Moreover, in environments with minimum texture (e.g., minimal variation in the scene) that do not contain many distinct objects, the pixel gradients in images obtained in these environments may not be pronounced. As a result, it may be different for an ego vehicle to obtain enough visual features (e.g., keypoints) to share with a target vehicle. This may limit the ability to obtain the relative pose in such environments.

Figure 9:
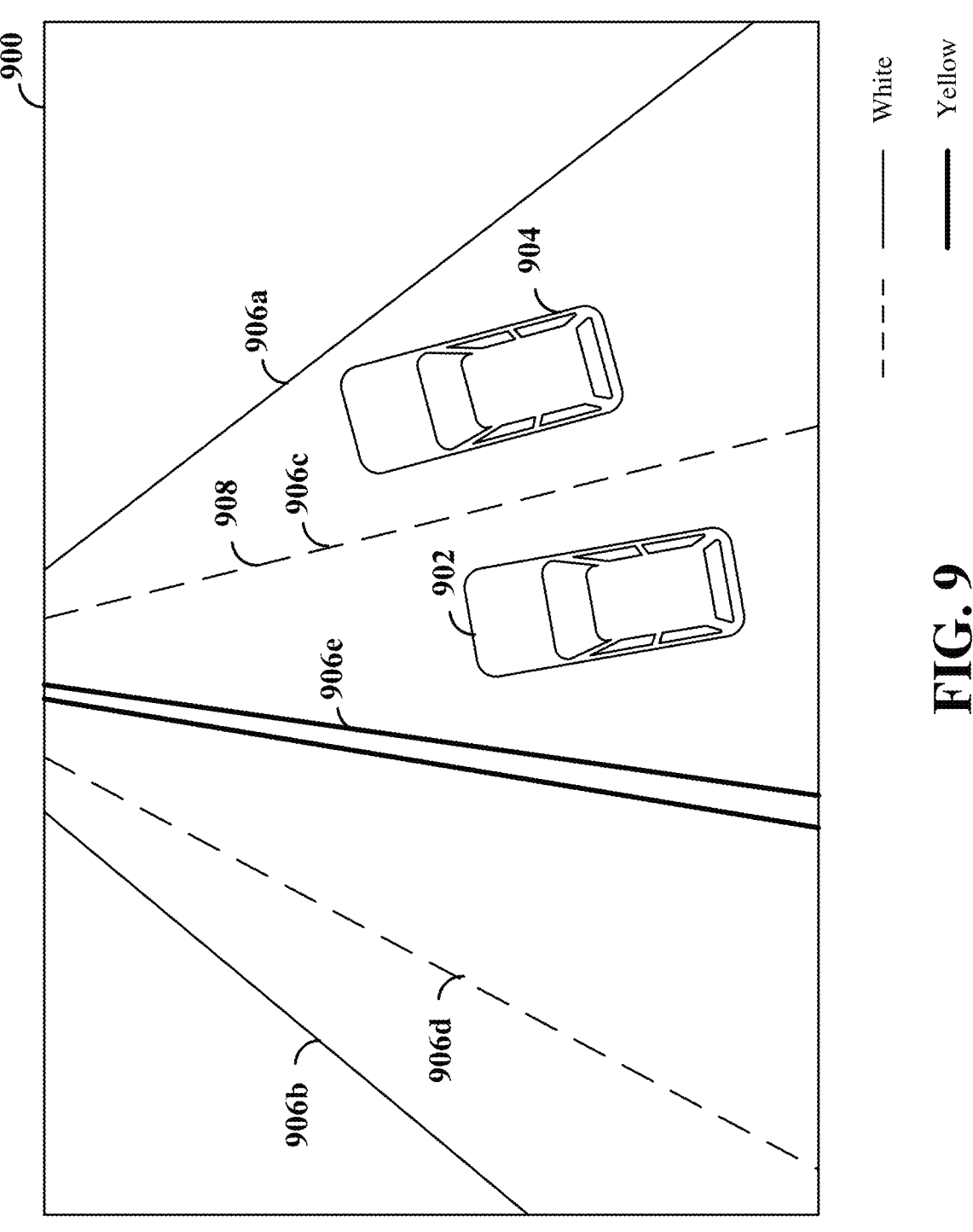
FIG. 9 is a diagram illustrating an example of a low texture environment according to some aspects.

FIG. 9 is a diagram illustrating an example of a low texture environment 900 including an ego vehicle 902 and a target vehicle 904 according to some aspects. As shown in the example of FIG. 9, in most expected travel scenarios, lane markers 906*a*, 906*b*, 906*c*, 906*d*, and 906*e* may be present on roads. The lane markers 906*a*-906*e* may have different colors (e.g., white or yellow) and may be of different types (e.g., double solid, single solid, or dashed (broken)). In some examples, in such low texture environments 900, keypoints may be chosen from corner points 908 of lane markers. For example, corner points of broken lane markers (e.g., lane marker 906*c*) may be used due to their higher gradients.

Various aspects are related to using lane markers (e.g., lane markers 906*a*-906*e*) in conjunction with keypoints (e.g., corner point 908) to obtain the relative poses between vehicles (e.g., vehicles 902 and 904). In some examples, by using lane markers, the ego vehicle 902 may transmit a reduced number of visual features, which can lower the communication overhead required for transmitting visual features to the target vehicle 904. Moreover, in low texture environments, as shown in FIG. 9, using only a few visual features (keypoints), together with the lane markers 906*a*-906*c*, may enable the target vehicle 904 to obtain the relative pose.

In some examples, the ego vehicle (e.g., a transmitting wireless communication device) may transmit lane features identifying traffic lane markers, along with a plurality of first features (e.g., first keypoints) to the target vehicle (e.g., a receiving wireless communication device). In some examples, the plurality of first features provided by the transmitting wireless communication device may include a subset of a larger set of first features obtained by the transmitting wireless communication device in order to reduce overhead. In other examples, the plurality of first features include all or a substantial portion of the visual features obtained in a low texture environment. To utilize the lane markers and visual features to determine the relative pose, the transmitting wireless communication device may further transmit two-line two-point (2L2P) metrics to the receiving wireless communication device.

Figure 10:
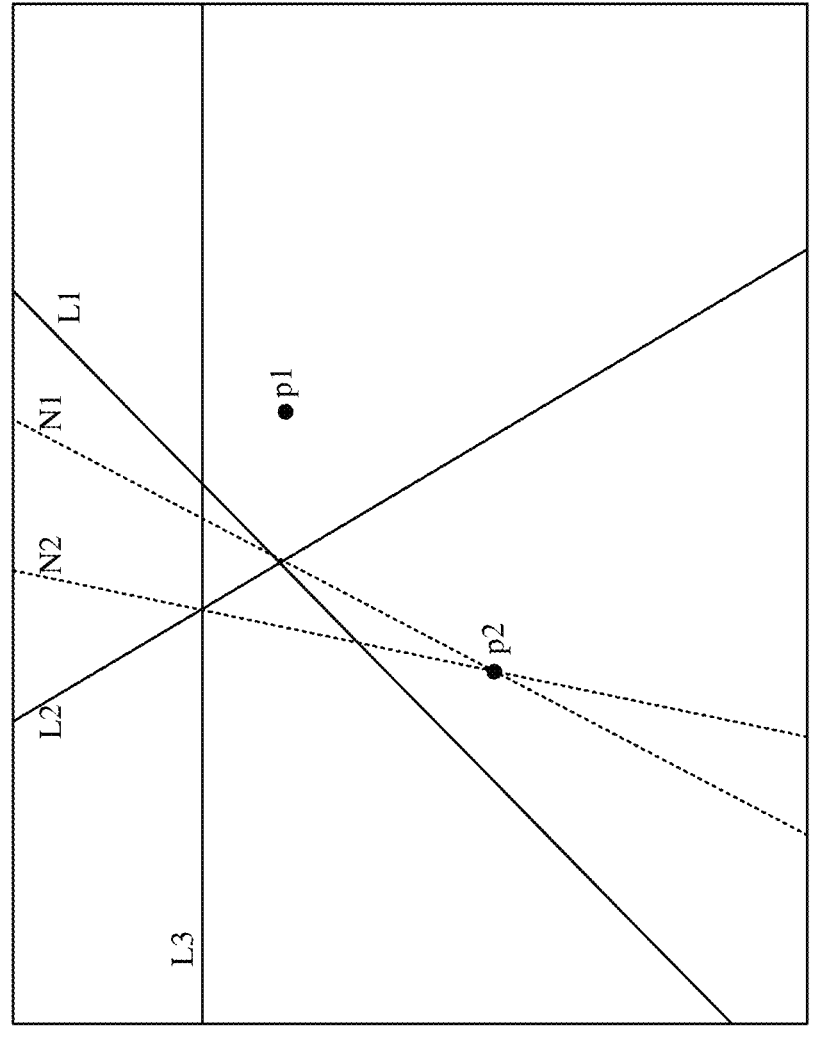
FIG. 10 is a diagram illustrating an example of a 2L2P invariant according to some aspects.

FIG. 10 is a diagram illustrating an example of a 2L2P invariant according to some aspects. A 2L2P invariant is a projective geometry invariant that defines four coplanar features (e.g., two lines and two points) that remain unchanged under projective transformation. Here, the two lines may correspond to two lane markers, whereas the two points may correspond to two keypoints. In the example shown in FIG. 9, let $L_1$ and $L_2$ be the two lines and $p_1$ and $p_2$ be the two points. A 2L2P metric may then be defined as:

$$2L2P(L_1, L_2, p_1, p_2) = \frac{\frac{L_1 \cdot p_1}{L_2 \cdot p_1}}{\frac{L_1 \cdot p_2}{L_2 \cdot p_2}} \qquad \text{(Equation 1)}$$

The above 2L2P metric (shown in Equation 1) defines the ratios of distance ratios of point $p_i$ from line $L_k$. If $2L2P(L_1, L_2, p_1, p_2)=\alpha$, then all points q such that $2L2P(L_1, L_2, p_1, q)=\alpha$ lie on a line $N_1$ through $p_2$. In addition, if $2L2P(L_3, L_2, p_1, p_2)=\beta$, then all points q such that $2L2P(L_3, L_2, p_1, q)=\beta$ lie on a line $N_2$ through $p_2$. Hence $x=p_2$ is uniquely determined from $2L2P(L_1, L_2, p_1, x)=\alpha$ and $2L2P(L_3, L_2, p_1, x)=\beta$. In other words, $\{L_1, L_2, L_3, p_1\}$ forms a basis for defining points $\{p_k\}$, $k\neq 1$ by defining 2L2P pairs $\{\alpha_k, \beta_k\}$.

In general, $2L2P(L_i, L_j, p_m, p_n)$ represents a scalar providing the invariant measure of points $p_m$, $p_n$ with respect to lines $L_i$, $L_j$. In addition, $2L2P(L_i, L_j, L_k, p_m, p_n)$ represents a tuple $(\alpha, \beta)$, where a represents the invariant measure of points $p_m$, $p_n$ with respect to lines $L_i$, $L_j$, and $\beta$ represents the invariant measure of points $p_m$, $p_n$ with respect to lines $L_i$, $L_k$.

Figure 11:
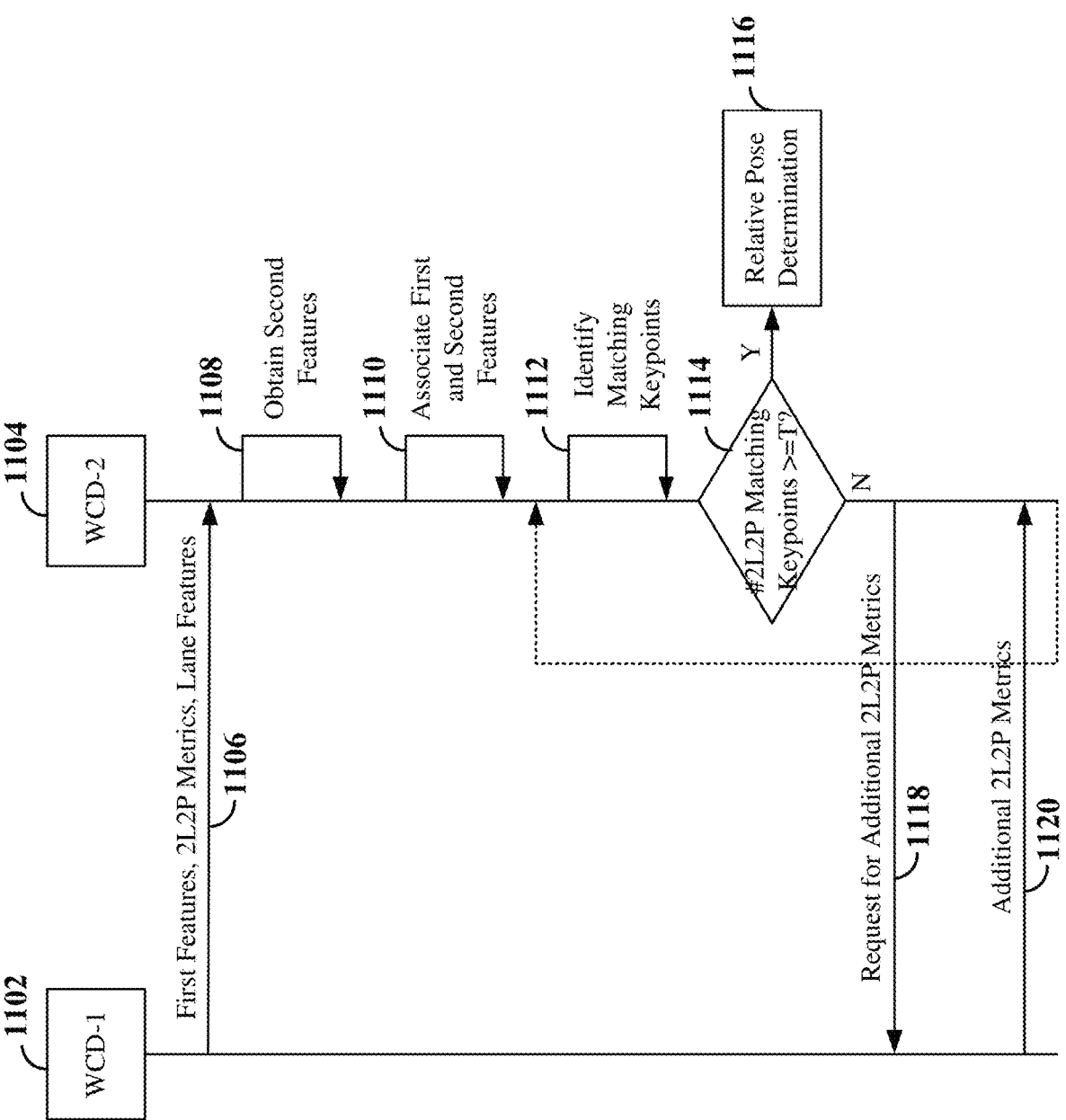
FIG. 11 is a diagram illustrating an example of a relative pose determination leveraging lane markers according to some aspects.

FIG. 11 is a diagram illustrating an example of a relative pose determination leveraging lane markers according to some aspects. In the example shown in FIG. 11, a transmitting wireless communication device (WCD-1) 1102 (e.g., an ego vehicle) is in communication with a receiving wireless communication device (WCD-2) 1104 (e.g., a target vehicle). Each of the WCD-1 1102 and the WCD-2 1104 may be, for example, a vehicle, a UE, a V2X device, or a sidelink device. The WCD-1 1102 and the WCD-2 1104 may be in the vicinity of one another. In some examples, the WCD-1 1102 and WCD-2 1104 may have established a sidelink therebetween (e.g., via discovery signals).

At 1106, the WCD-1 1102 may transmit a message including a plurality of first features in a first field of view of the WCD-1 1102, lane features, and 2L2P metrics to the WCD-2 1104. In some examples, the WCD-1 1102 may transmit the plurality of first features, lane features, and 2L2P metrics in response to a request for visual feature sharing, as shown in FIG. 7. In some examples, each of the first features may include a respective first keypoint of a first image captured by the WCD-1 1102. In other examples, each of the first features may include a respective first keypoint and corresponding first feature descriptor. The first feature descriptors may be SIFT, ORB, HOG (histogram of oriented gradients), GLOH (gradient location and orientation histogram), and/or SURF (speeded up robust features) feature descriptors. In some examples, the plurality of first features may include, for example, a subset of a larger set of first features obtained by the WCD-1 1102 to reduce communication overhead.

In an example, the message may include keypoints {p}, the respective descriptors for keypoints {p}, and $2L2P(L_i,$ $L_j, p_m, p_n)$ metrics for a random or ordered set of keypoints $\{\tilde{p}\} \subset \{p\}$ with respect to traffic lane markers (e.g., lines) $L_i$, $L_j$. Here, $p_m, p_n \in \{p\}$, $(m\neq n)$. In some examples, $\{\tilde{p}\}$ may be chosen such that they denote the corner points of a broken lane (e.g., corner point 908 shown in FIG. 9) not considered as a part of the 2L2P metric. For example, if $L_i$, $L_j$ are the lines considered in the 2L2P metric (e.g., as in $2L2P(L_i, L_j, p_m, p_n))$, then the keypoints $p_m$, $p_n$ are chosen from the corner points of another lane marker $L_k(k\neq i, j)$ or from multiple other lane markers. As indicated above, corner points of broken lane markers may have higher gradients, and therefore, using corner points of a broken lane marker increase the possibility (enhance the likelihood) of obtaining the correct corresponding keypoints (e.g., achieving a match) in WCD-2's view. In other examples, $\{\tilde{p}\}$ may be constrained to lie in a space between a pair of lane markers (e.g., $L_i$, $L_j$ or $L_i$, $L_k$). This constraint may further be included in the message. For example, the message may further indicate the pair of lane markers between which $\{\tilde{p}\}$ may be located. In some examples, the pair of traffic lane markers includes at least one of the traffic lane markers $L_i$, $L_j$ used in the 2L2P metrics.

The lane features may identify at least two traffic lane markers used in the 2L2P metrics sent to the WCD-2 1104. For example, the lane features may include a respective color (e.g., yellow or white) of each traffic lane marker used in the 2L2P metrics, a respective type of traffic lane marker (e.g., double solid, single solid, dashed/broken) of each traffic lane marker used in the 2L2P metrics, and/or an order in which the traffic lane marked may be viewed using a preconfigured rule (e.g., left to right or right to left).

In some examples, the message may be transmitted via one or more of a unicast sidelink message, a multicast (or groupcast) sidelink message, or a broadcast sidelink message. In other examples, the message may be transmitted via a network entity (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) in wireless communication with the WCD-1 1102 and WCD-2 1104. For example, the message may be transmitted to the network entity via a Uu link between WCD-1 1102 and the network entity and the network entity may transmit the request to the WCD-2 1104 via a Uu link between the network entity and the WCD-2 1104.

At 1108, the WCD-2 1104 may obtain a plurality of second features in a second field of view associated with the first wireless communication device. Each of the second features may include a respective second keypoint of a second image captured by the WCD-2. In other examples, each of the second features may include a respective second keypoint and corresponding second feature descriptor. The WCD-2 1104 may identify the plurality of second features in the second image using FAST, BRIEF, ORB, SIFT, Harris corner points or another keypoint detection algorithm. The WCD-2 1104 may further determine (e.g., calculate) second feature descriptors for each feature. The second feature descriptors may be SIFT, ORB, HOG, GLOH, and/or SURF feature descriptors.

At 1110, the WCD-2 1104 ma associate the plurality of first features with the plurality of second features to obtain a set of corresponding keypoints within the plurality of second features that correspond to respective first keypoints within the plurality of first features. For example, the WCD-2 1104 may obtain the set of corresponding keypoints $\{q\}$ by matching the plurality of second features $\{s\}$ with the plurality of first features $\{p\}$ using, for example, the descriptors of $\{p\}$.

At 1112, the WCD-2 1104 may identify matching keypoints within the set of corresponding keypoints for which the respective 2L2P metric is satisfied. For example, for those corresponding points $\{q_m, q_m\} \in q$, the WCD-2 1104 checks whether the $2L2P(L_i, L_j, q_m, q_n)$ metric is satisfied. As an example, the initial $2L2P$ $(L_i, L_j, p_m, p_n)$ metric sent by WCD-1 1102 for keypoints $\{p_m, p_n\}$ may be a specific value (e.g., 0.5). The WCD-2 1104 may calculate a new $2L2P$ $(L_i, L_j, q_m, q_n)$ for the corresponding set of keypoints obtained by WCD-2 1104 (e.g., $\{q_m, q_n\}$ corresponding to $\{p_m, p_n\}$) and compare the initial 2L2P metric to the new 2L2P metric. If the new 2L2P metric is within a threshold amount from the initial 2L2P metric (e.g., 0.05), the WCD-2 1104 may consider the 2L2P metric for keypoints $\{q_m, q_m\}$ satisfied. Let $\{r\} \sqsubset \{q\}$ represent the matching keypoints for which the corresponding 2L2P metric is satisfied. In this example, $\{r\}$ represents the matching keypoints within the set of corresponding keypoints that are most likely to be a true match since the additional 2L2P constraint has been satisfied.

At 1114, the WCD-2 1104 determines whether a number of matching keypoints (e.g., number of keypoints within $\{r\}$) is below a threshold. In some examples, the threshold may be three, five, eight, or other suitable number. Assuming that the threshold is five, if $|\{r\}| \geq 5$, the minimum number of keypoints required to determine the relative pose has been met. Therefore, at 1116, the WCD-2 1104 can calculate the relative pose of the WCD-2 1104 with respect to the WCD-1 1102 based on the matching keypoints.

However, if $|\{r\}| < 5$, at 1118, the WCD-2 1104 can transmit a request for additional 2L2P metrics to the WCD-1 1102. For example, the WCD-2 1104 can request respective additional 2L2P metrics associated with additional pairs of first keypoints outside the set of pairs of first keypoints initially used by the WCD-1 to provide the initial 2L2P metrics. Thus, the WCD-2 1104 may request the WCD-1 1102 to provide additional 2L2P metrics for additional pairs of first keypoints for which the WCD-2 1104 does not have the corresponding 2L2P metric. In some examples, the request includes a preferred keypoint of the matching keypoints that WCD-1 1102 should use in its basis for the additional 2L2P metrics. For example, the request may include matching keypoint $p_t$, which corresponds to $q_t$ in the coordinate system of WCD-2 1104, where $q_t \in \{r\}$. For example, the preferred keypoint $q_t$ may correspond to one of the matching keypoints for which the 2L2P metric has been satisfied, and as such, can provide a good basis for additional 2L2P metrics. Thus, the preferred keypoint may be included in each of the additional pairs of first keypoints for the respective additional 2L2P metrics. In other examples, the request may include the additional pairs of first keypoints for which the respective additional 2L2P metrics are requested.

At 1120, the WCD-1 1102 may transmit the respective additional 2L2P metrics requested by the WCD-2 1104. In some examples, the WCD-1 1102 can use the preferred keypoint, the two initial traffic lane markers, along with an additional traffic lane marker as a basis for the additional 2L2P metrics. For example, the WCD-1 1102 can provide $2L2P(L_i, L_j, L_k, p_t, p_n)$ metrics for a few other first keypoints $\{f\}$, where $p_n \in \{f\}$ by considering $2L2P$ $(L_i, L_j, L_k, p_t)$ as a basis. In this case, WCD-1 1102 provides only the $2L2P(L_i, L_j, L_k, p_t, p_n)$ metric and does not need to provide the feature descriptors of $\{f\}$, as the WCD-2 1104 can deterministically identify the corresponding keypoint $\{g\}$ relating to (corresponding to) $\{f\}$ from the $2L2P$ $(L_i, L_j, L_k, p_t, p_n)$ metric. Thus, WCD-2 1104 is able to identify the additional matching points for which the additional 2L2P metrics are satisfied without receiving an indication of the respective other first keypoints.

In other examples, the WCD-2 1104 may not provide a preferred keypoint in the request. In this example, WCD-1 1102 may identify additional pairs of first keypoints including other first keypoints excluded from the plurality of first features initially provided by the WCD-1 1102. For example, the other first keypoints may be within the larger set of first keypoints obtained by the WCD-1 1102, but not provided to the WCD-2 1104 in the message transmitted at 1106. In this example, the WCD-1 1102 may provide the additional 2L2P metrics, along with an indication of each of the other first keypoints and a respective keypoint descriptor associated therewith.

In other examples in which the request includes the additional pairs of first keypoints requested by the WCD-2 1104, the WCD-1 1102 may provide only the additional 2L2P metrics for the requested additional pairs of first keypoints. Here, the WCD-1 1102 may not provide feature descriptors associated with the additional pairs of first keypoints.

From the additional 2L2P metrics, at 1112, the WCD-2 1104 can again identify additional matching keypoints for which the additional respective 2L2P metric is satisfied. For example, for every $2L2P(L_i, L_j, L_k, p_t, p_n)=(\alpha, \beta)$ sent by WCD-1 1102, WCD-2 1104 can deterministically obtain a corresponding (matching) keypoint $g_n$ by solving for $2L2P$ $(L_i, L_j, L_k, q_t, x)=\alpha$ and $2L2P(L_i, L_j, L_k, q_t, x)=\beta$. Solving for $x$ yields the intersection point $x=g_n$. That is, keypoint $g_n$ is obtained uniquely by the intersection of lines obtained by the signaled metrics $2L2P(L_i, L_j, L_k, q_t, x)=\alpha$ and $2L2P(L_i, L_j, L_k, q_t, x)=\beta$. Here, again, $q_t, p_t$ are the corresponding keypoints (as well as the basis points) in the field of view of WCD-2 1104 and WCD-1 1102, respectively.

Figure 12:
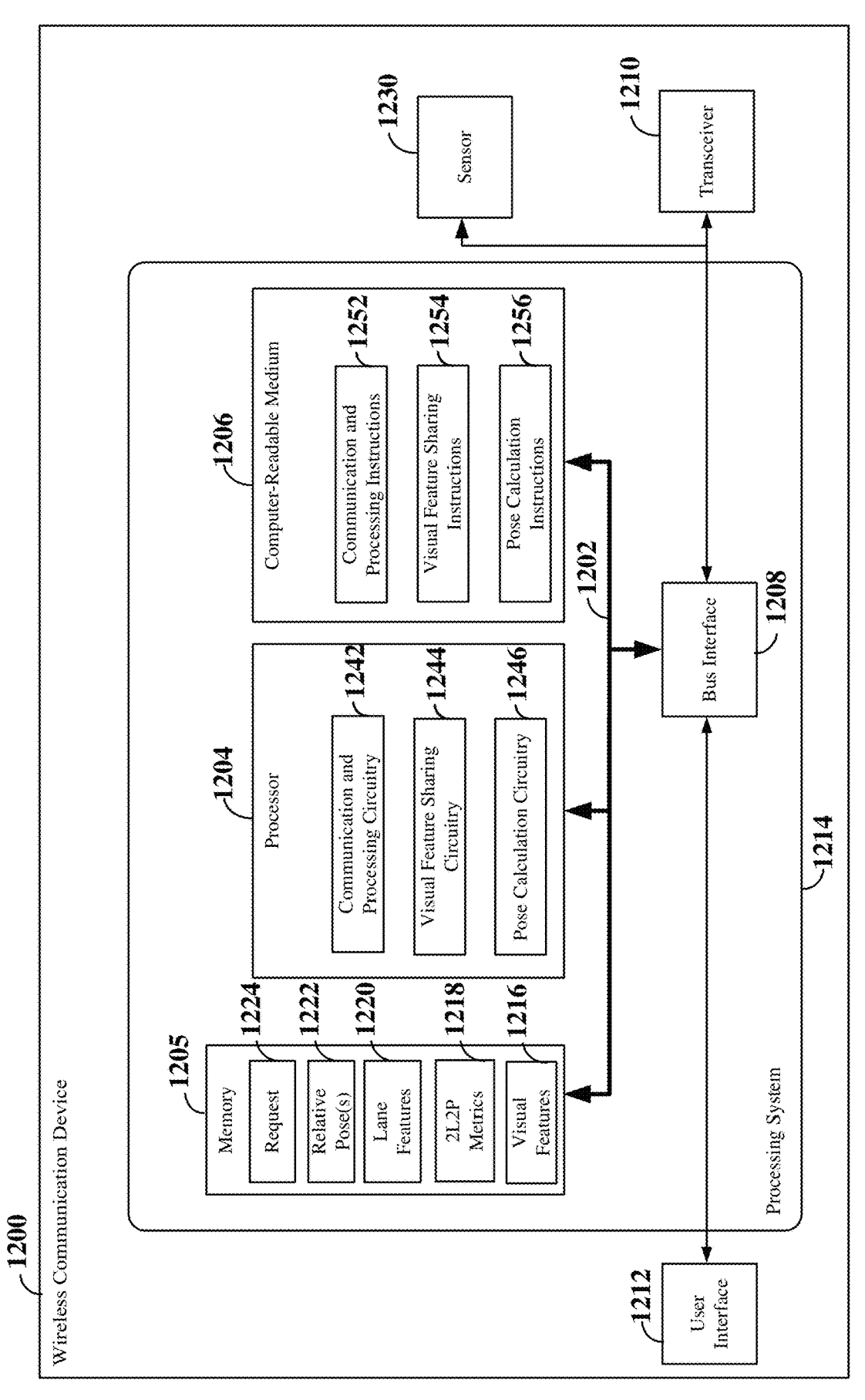
FIG. 12 is a block diagram illustrating an example of a hardware implementation for a wireless communication device employing a processing system according to some aspects.

FIG. 12 is a block diagram illustrating an example of a hardware implementation for a wireless communication device 1200 employing a processing system 1214. For example, the wireless communication device 1200 may correspond to a sidelink device, such as a vehicle or other V2X device, as shown and described above in reference to FIGS. 1, 3, 6, 7, and/or 9.

The wireless communication device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in the wireless communication device 1200, may be used to implement any one or more of the processes and procedures described below.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a transceiver 1210. The transceiver 1210 provides a communication interface or a means for communicating with various other apparatus over a transmission medium (e.g., air interface). Depending upon the nature of the apparatus, a user interface 1212 (e.g., keypad, display, touch screen, speaker, microphone, control knobs, etc.) may also be provided. Of course, such a user interface 1212 is optional, and may be omitted in some examples. In addition, the bus interface 1208 may further provide an interface between the bus 1202 and a sensor 1230, such as a camera.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store one or more of visual features 1216 (e.g., keypoints and associated keypoint descriptors), 2L2P metrics 1218, lane features 1220, one or more relative poses 1222, and/or a request 1224 for additional 2L2P metrics/visual features, which may be used by the processor 1204 in visual feature sharing applications.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system. In some examples, the computer-readable medium 1206 may be implemented on an article of manufacture, which may further include one or more other elements or circuits, such as the processor 1204 and/or memory 1205.

In some aspects of the disclosure, the processor 1204 may include circuitry configured for various functions. For example, the processor 1204 may include communication and processing circuitry 1242, configured to communicate with one or more sidelink devices (e.g., other wireless communication devices) via respective sidelinks (e.g., PC5 interfaces). In addition, the communication and processing circuitry 1242 may be configured to communicate with a network entity (e.g., a base station, such as a gNB or eNB) via a Uu link. In some examples, the communication and processing circuitry 1242 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1242 may include one or more transmit/receive chains.

In some implementations where the communication involves receiving information, the communication and processing circuitry 1242 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1242 may output the information to another component of the processor 1204, to the memory 1205, or to the bus interface 1208. In some examples, the communication and processing circuitry 1242 may receive one or more of signals, messages, other information, or any combination thereof. In some examples, the communication and processing circuitry 1242 may receive information via one or more channels. In some examples, the communication and processing circuitry 1242 may include functionality for a means for receiving. In some examples, the communication and processing circuitry 1242 may include functionality for a means for processing, including a means for demodulating, a means for decoding, etc.

In some implementations where the communication involves sending (e.g., transmitting) information, the communication and processing circuitry 1242 may obtain information (e.g., from another component of the processor 1204, the memory 1205, or the bus interface 1208), process (e.g., modulate, encode, etc.) the information, and output the processed information. For example, the communication and processing circuitry 1242 may output the information to the transceiver 1210 (e.g., that transmits the information via radio frequency signaling or some other type of signaling suitable for the applicable communication medium). In some examples, the communication and processing circuitry 1242 may send one or more of signals, messages, other information, or any combination thereof. In some examples, the communication and processing circuitry 1242 may send information via one or more channels. In some examples, the communication and processing circuitry 1242 may include functionality for a means for sending (e.g., a means for transmitting). In some examples, the communication and processing circuitry 1242 may include functionality for a means for generating, including a means for modulating, a means for encoding, etc.

In examples in which the wireless communication device 1200 is a target (or receiving) wireless communication device (e.g., a target vehicle), the communication and processing circuitry 1242 may be configured to receive, via the transceiver 1210, lane features 1220 identifying two (or more) traffic lane markers from another wireless communication device (e.g., a second wireless communication device). In some examples, the lane features 1220 may include lane one or more of a lane marker color, a type of lane marker, or an order in which lane markers are viewed based on a rule. The communication and processing circuitry 1242 may further be configured to store the lane features 1220 within, for example, memory 1205.

In addition, the communication and processing circuitry 1242 may be configured to receive, via the transceiver 1210, a plurality of first features (e.g., visual features 1216) in a first field of view associated with the second wireless communication device. Here, each first feature in the plurality of first features may include a respective first keypoint of a first image captured by the second wireless communication device. In some examples, each first feature in the plurality of first features further includes a respective first feature descriptor corresponding to the respective first keypoint. The communication and processing circuitry 1242 may further be configured to store the received plurality of first features 1216 within, for example, memory 1205 for further processing.

The communication and processing circuitry 1242 may further be configured to receive, via the transceiver 1210, a respective two-point two-line (2L2P) metric 1218 for each pair of first keypoints within a set of pairs of first keypoints of the plurality of first features based on the two traffic lane markers from the second wireless communication device. In some examples, the set of pairs of first keypoints include corner point features of at least one additional traffic lane marker excluded from the two traffic lane markers. For example, the at least one additional traffic lane marker may include a broken lane marker. In some examples, the set of pairs of first keypoints may lie in a space between a pair of traffic lane markers. In this example, the communication and processing circuitry 1242 may further be configured to receive an indication of the pair of traffic lane markers from the second wireless communication device. In some examples, the pair of traffic lane markers may include at least one of the two traffic lane markers. The communication and processing circuitry 1242 may further be configured to store the 2L2P metrics 1218 within, for example, memory 1205.

In examples in which the wireless communication device 1200 is a transmitting wireless communication device (e.g., an ego vehicle), the communication and processing circuitry 1242 may be configured to transmit, via the transceiver 1210, lane features 1220 identifying two (or more) traffic lane markers to at least one other wireless communication device. In addition, the communication and processing circuitry 1242 may be configured to transmit, via the transceiver 1210, a plurality of features 1216 in a field of view associated with the wireless communication device 1200.

Each feature in the plurality of features may include a respective keypoint of an image captured by the wireless communication device 1200. The communication and processing circuitry 1242 may further be configured to transmit, via the transceiver 1210, a respective two-point two-line (2L2P) metric 1218 for each pair of keypoints within a set of pairs of keypoints of the plurality of features 1216 based on the two traffic lane markers.

In some examples, each feature 1216 in the plurality of features further includes a respective feature descriptor corresponding to the respective keypoint. In some examples, the lane features 1220 include one or more of a lane marker color, a type of lane marker, or an order in which lane markers are viewed based on a rule. In some examples, the plurality of features 1216 include corner point features of at least one additional traffic lane marker excluded from the two traffic lane markers. For example, the at least one additional traffic lane marker may be a broken lane marker. In some examples, the plurality of features lie in a space between a pair of traffic lane markers. In this example, the communication and processing circuitry 1242 may further be configured to transmit an indication of the pair of traffic lane markers to at least one other wireless communication device. In some examples, the pair of traffic lane markers may include at least one of the two traffic lane markers. The communication and processing circuitry 1242 may further be configured to execute communication and processing instructions (software) 1252 stored in the computer-readable medium 1206 to implement one or more of the functions described herein.

The processor 1204 may further include visual feature sharing circuitry 1244, configured for visual feature sharing between the wireless communication device 1200 and at least one other wireless communication device. In examples in which the wireless communication device 1200 is the receiving (target) wireless communication device, the visual feature sharing circuitry 1244 may be configured to control the sensor 1230 to take a second image in a second field of view of the wireless communication device 1200 and to process the second image to extract (obtain) a plurality of second features. Here, each second feature in the plurality of second features may include a respective second keypoint of the second image captured by the sensor 1230. The visual feature sharing circuitry 1244 may further be configured to receive, via the communication and processing circuitry 1242 and the transceiver 1210, the lane features 1220, the plurality of first features 1216, and the 2L2P metrics 1218 from the second wireless communication device.

The visual feature sharing circuitry 1244 may further be configured to transmit, via the communication and processing circuitry 1242 and the transceiver 1210, a request 1224 for respective additional 2L2P metrics associated with additional pairs of first keypoints outside the set of pairs of first keypoints to the second wireless communication device. In addition, the visual feature sharing circuitry 1244 may be configured to receive, via the communication and processing circuitry 1242 and the transceiver 1210, the respective additional 2L2P metrics from the second wireless communication device.

In examples in which the wireless communication device is a transmitting wireless communication device, the visual feature sharing circuitry 1244 may be configured to generate and transmit, via the communication and processing circuitry 1242 and the transceiver 1210, the lane features 1220, the plurality of features 1216, and the 2L2P metrics 1218 to the at least one other wireless communication device. For example, the visual feature sharing circuitry 1244 may be configured to control the sensor 1230 to take the image and to generate (obtain/extract) the plurality of features 1216 from the image. The visual feature sharing circuitry 1244 may further be configured to identify the lane features 1220 based on the image or other sensor data (e.g., other images or data). The visual feature sharing circuitry 1244 may further be configured to select the pairs of keypoints and to calculate the respective 2L2P metric 1218 for each pair of keypoints.

The visual feature sharing circuitry 1244 may further be configured to receive, via the communication and processing circuitry 1242 and the transceiver 1210, a request for respective additional 2L2P metrics 1218 associated with additional pairs of keypoints outside the set of pairs of keypoints from the at least one other wireless communication device. In some examples, the request includes a preferred keypoint included in each of the additional pairs of first keypoints for the respective additional 2L2P metrics. In some examples, the visual feature sharing circuitry 1244 may be configured to use the preferred keypoint, the two traffic lane markers, and an additional traffic lane marker as a basis for the additional 2L2P metrics. In some examples, each of the additional pairs of keypoints includes the preferred keypoint an a respective other keypoint within a subset of the plurality of features. In some examples, the request includes the additional pairs of keypoints for which the respective 2L2P metrics are requested.

In addition, the visual feature sharing circuitry 1244 may be configured to transmit, via the communication and processing circuitry 1242 and the transceiver 1210, the respective additional 2L2P metrics to the at least one other wireless communication device. In some examples, each of the additional pairs of keypoints includes other keypoints excluded from the plurality of features. In this example, the visual feature sharing circuitry 1244 may be configured to transmit the additional 2L2P metrics 1218 and an indication of each of the other keypoints including a respective keypoint descriptor associated therewith. The visual feature sharing circuitry 1244 may further be configured to execute visual feature sharing instructions (software) 1254 stored in the computer-readable medium 1206 to implement one or more of the functions described herein.

In examples in which the wireless communication device 1200 is the receiving (target) wireless communication device, the processor 1204 may further include pose calculation circuitry 1246, configured to calculate the relative pose (e.g., relative pose 1222) between the wireless communication device 1200 and the second wireless communication device. In some examples, the pose calculation circuitry 1246 may be configured to associate the plurality of first features 1216 with the plurality of second features 1216 to obtain a set of corresponding keypoints within the plurality of second features that correspond to respective first keypoints within the plurality of first features. In some examples, each first feature in the plurality of first features 1216 further includes a respective first feature descriptor corresponding to the respective first keypoint, and each second feature in the plurality of second features 1216 further includes a respective second feature descriptor corresponding to the respective second keypoint. In this example, the pose calculation circuitry 1246 may be configured to associate the plurality of first features with the plurality of second features based on the first keypoints, the second keypoints, the first feature descriptors, and the second feature descriptors.

In addition, the pose calculation circuitry 1246 may further be configured to identify matching keypoints within the set of corresponding keypoints for which the respective 2L2P metric 1218 is satisfied. The pose calculation circuitry 1246 may then be configured to calculate the relative pose of the wireless communication device 1200 with respect to the second wireless communication device based on the matching keypoints.

The pose calculation circuitry 1246 may further be configured to determine a number of matching keypoints and compare the number of matching keypoints to a threshold. In response to the number of matching keypoints being less than the threshold, the pose calculation circuitry 1246 may be configured to operate together with the visual feature sharing circuitry 1244 to transmit the request 1224 for the additional 2L2P metrics 1218 to the second wireless communication device. In some examples, the request includes a preferred keypoint of the matching keypoints to be included in each of the additional pairs of first keypoints for the respective additional 2L2P metrics. In some examples, the respective additional 2L2P metrics 1218 use the preferred keypoint, the two traffic lane markers and an additional traffic lane marker as a basis. In some examples, the request 1224 includes the additional pairs of keypoints for which the respective 2L2P metrics 1218 are requested. In some examples, each of the additional pairs of first keypoints includes other first keypoints excluded from the plurality of first features. In this example, the visual feature sharing circuitry 1244 may receive the additional 2L2P metrics and an indication of each of the other first keypoints and a respective keypoint descriptor associated therewith.

Upon receiving the additional 2L2P metrics, the pose calculation circuitry 1246 may further be configured to identify additional matching keypoints for which the additional respective 2L2P metric is satisfied to calculate the relative pose. In some examples, each of the additional pairs of first keypoints includes the preferred keypoint and a respective other keypoint within a subset of the plurality of first features 1216. In this example, pose calculation circuitry 1246 may be configured to identify the additional matching points for which the additional 2L2P metrics are satisfied without receiving an indication of the respective other first keypoints from the second wireless communication device. The pose calculation circuitry 1246 may further be configured to execute pose calculation instructions (software) 1256 stored in the computer-readable medium 1206 to implement one or more of the functions described herein.

FIG. 13 is a flow chart of an exemplary process 1300 for relative pose determination leveraging lane markers according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1302, the wireless communication device (e.g., a first wireless communication device) may receive lane features identifying two traffic lane markers from a second wireless communication device. In some examples, the lane features may include one or more of a lane marker color, a type of lane marker, or an order in which lane markers are viewed based on a rule. For example, the communication and processing circuitry 1242, together with the visual feature sharing circuitry 1244 and transceiver 1210, shown and described above in connection with FIG. 12, may provide a means to receive the lane features.

At block 1304, the first wireless communication device may receive a plurality of first features in a first field of view associated with the second wireless communication device, in which each first feature in the plurality of first features includes a respective first keypoint of a first image captured by the second wireless communication device. The communication and processing circuitry 1242, together with the visual feature sharing circuitry 1244 and transceiver 1210, shown and described above in connection with FIG. 12, may provide a means to receive the plurality of first features.

At block 1306, the first wireless communication device may receive a respective two-point two-line (2L2P) metric for each pair of first keypoints within a set of pairs of first keypoints of the plurality of first features based on the two traffic lane markers from the second wireless communication device. In some examples, the set of pairs of first keypoints include corner point features of at least one additional traffic lane marker excluded from the two traffic lane markers. For example, the at least one additional traffic lane marker may include a broken lane marker. In some examples, the set of pairs of first keypoints lie in a space between a pair of traffic lane markers. In this example, the first wireless communication device may further receive an indication of the pair of traffic lane markers from the second wireless communication device. In some examples, the pair of traffic lane markers includes at least one of the two traffic lane markers. For example, the communication and processing circuitry 1242, together with the visual feature sharing circuitry 1244 and transceiver 1210, shown and described above in connection with FIG. 12, may provide a means to receive the 2L2P metrics.

At block 1308, the first wireless communication device may obtain a plurality of second features in a second field of view associated with the first wireless communication device, in which each second feature in the plurality of second features includes a respective second keypoint of a second image captured by the first wireless communication device. For example, the pose calculation circuitry 1246, together with the sensor 1230, shown and described above in connection with FIG. 12, may provide a means to obtain the plurality of second features.

At block 1310, the first wireless communication device may associate the plurality of first features with the plurality of second features to obtain a set of corresponding keypoints within the plurality of second features that correspond to respective first keypoints within the plurality of first features. In some examples, each first feature in the plurality of first features further includes a respective first feature descriptor corresponding to the respective first keypoint, and each second feature in the plurality of second features further includes a respective second feature descriptor corresponding to the respective second keypoint. In this example, the first wireless communication device may associate the plurality of first features with the plurality of second features based on the first keypoints, the second keypoints, the first feature descriptors, and the second feature descriptors. For example, the pose calculation circuitry 1246 shown and described above in connection with FIG. 12 may provide a means to associate the first and second features to obtain the set of corresponding keypoints.

At block 1312, the first wireless communication device may identify matching keypoints within the set of corresponding keypoints for which the respective 2L2P metric is satisfied. For example, the pose calculation circuitry 1246 shown and described above in connection with FIG. 12 may provide a means to identify the matching keypoints.

At block 1314, the first wireless communication device may calculate a relative pose of the first wireless communication device with respect to the second wireless communication device based on the matching keypoints. For example, the pose calculation circuitry 1246 shown and described above in connection with FIG. 12, may provide a means to calculate the relative pose.

Figure 14:
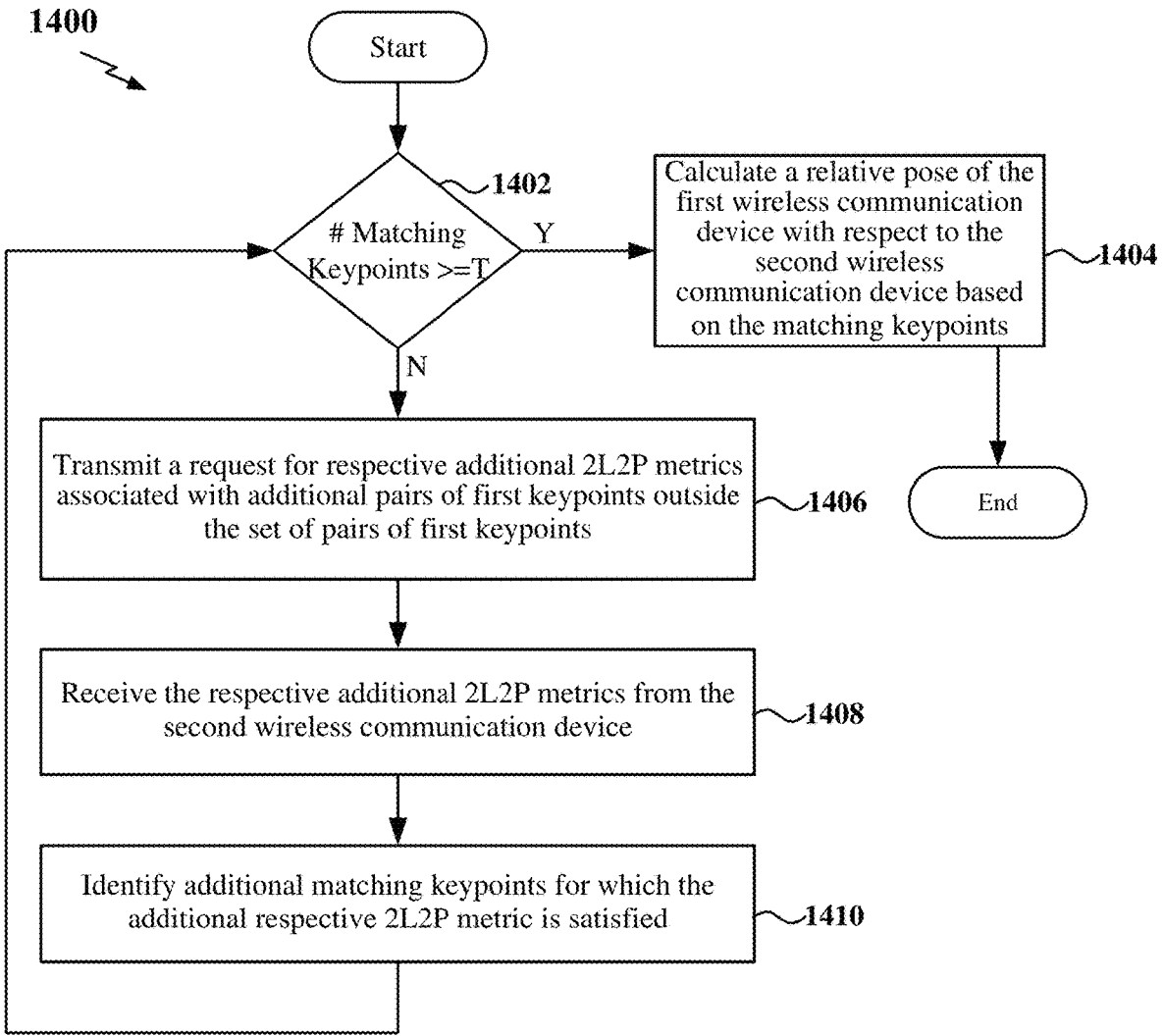
FIG. 14 is a flow chart of another exemplary process for relative pose determination leveraging lane markers according to some aspects.

FIG. 14 is a flow chart of another exemplary process 1400 for relative pose determination leveraging lane markers according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1402, the wireless communication device (e.g., a first wireless communication device) may determine whether a number of matching keypoints (e.g., as identified at block 1312 shown in FIG. 13) is greater than or equal to a threshold. In some examples, the threshold may be three, five, eight, or other suitable number of matching keypoints necessary to calculate the relative pose. For example, the pose calculation circuitry 1246 shown and described above in connection with FIG. 12, may provide a means to determine whether the number of matching keypoints is greater than or equal to the threshold.

If the number of matching keypoints is greater than or equal to the threshold (Y branch of block 1402), at block 1404, the first wireless communication device may calculate a relative pose of the first wireless communication device with respect to the second wireless communication device based on the matching keypoints. For example, the pose calculation circuitry 1246 shown and described above in connection with FIG. 12, may provide a means to calculate the relative pose.

If the number of matching keypoints is less than the threshold (N branch of block 1402), at block 1406, the first wireless communication device may transmit a request for respective additional 2L2P metrics associated with additional pairs of first keypoints outside the set of pairs of first keypoints. In some examples, the request includes a preferred keypoint of the matching keypoints, the preferred keypoint being included in each of the additional pairs of first keypoints for the respective additional 2L2P metrics. In some examples, the request includes the additional pairs of first keypoints for which the respective additional 2L2P metrics are requested. The pose calculation circuitry 1246, together with the visual feature sharing circuitry 1244, communication and processing circuitry 1242 and transceiver 1210, shown and described above in connection with FIG. 12, may provide a means to transmit the request for respective additional 2L2P metrics.

At block 1408, the first wireless communication device may receive the respective additional 2L2P metrics from the second wireless communication device. In some examples, the respective additional 2L2P metrics use the preferred keypoint, the two traffic lane markers and an additional traffic lane marker as a basis. In some examples, each of the additional pairs of first keypoints includes other first keypoints excluded from the plurality of first features. In this example, the first wireless communication device may receive the additional 2L2P metrics and an indication of each of the other first keypoints and a respective keypoint descriptor associated therewith. For example, the The pose calculation circuitry 1246, together with the visual feature sharing circuitry 1244, communication and processing circuitry 1242 and transceiver 1210, shown and described above in connection with FIG. 12, may provide a means to receive the respective additional 2L2P metrics.

At block 1410, the first wireless communication device may identify additional matching keypoints for which the additional respective 2L2P metric is satisfied. In some examples, each of the additional pairs of first keypoints includes the preferred keypoint and a respective other first keypoint within a subset of the plurality of first features. In this example, the first wireless communication device may identify the additional matching points for which the additional 2L2P metrics are satisfied without receiving an indication of the respective other first keypoints from the second wireless communication device. For example, the pose calculation circuitry 1246 shown and described above in connection with FIG. 12 may provide a means to identify the additional matching keypoints.

The process then reverts back to block 1402, where the first wireless communication device determines whether the number of matching keypoints (including the additional matching keypoints) is greater than or equal to a threshold. If so (Y branch of block 1402), at block 1404, the first wireless communication device calculates the relative pose thereof. If not (N branch of block 1402), the first wireless communication transmits another request for additional 2L2P metrics. This process may be repeated until at least the threshold number of matching keypoints are identified.

In one configuration, the wireless communication device 1200 includes means for receiving lane features identifying two traffic lane markers from a second wireless communication device, means for receiving a plurality of first features in a first field of view associated with the second wireless communication device, each first feature in the plurality of first features comprising a respective first keypoint of a first image captured by the second wireless communication device, and means for receiving a respective two-point two-line (2L2P) metric for each pair of first keypoints within a set of pairs of first keypoints of the plurality of first features based on the two traffic lane markers from the second wireless communication device. The wireless communication device may further include means for obtaining a plurality of second features in a second field of view associated with the first wireless communication device, each second feature in the plurality of second features comprising a respective second keypoint of a second image captured by the first wireless communication device, means for associating the plurality of first features with the plurality of second features to obtain a set of corresponding keypoints within the plurality of second features that correspond to respective first keypoints within the plurality of first features, means for identifying matching keypoints within the set of corresponding keypoints for which the respective 2L2P metric is satisfied, and means for calculating a relative pose of the first wireless communication device with respect to the second wireless communication device based on the matching keypoints. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3, 6, and/or 9, and utilizing, for example, the processes and/or algorithms described herein in relation to FIGS. 11, 13, and 14.

Figure 15:
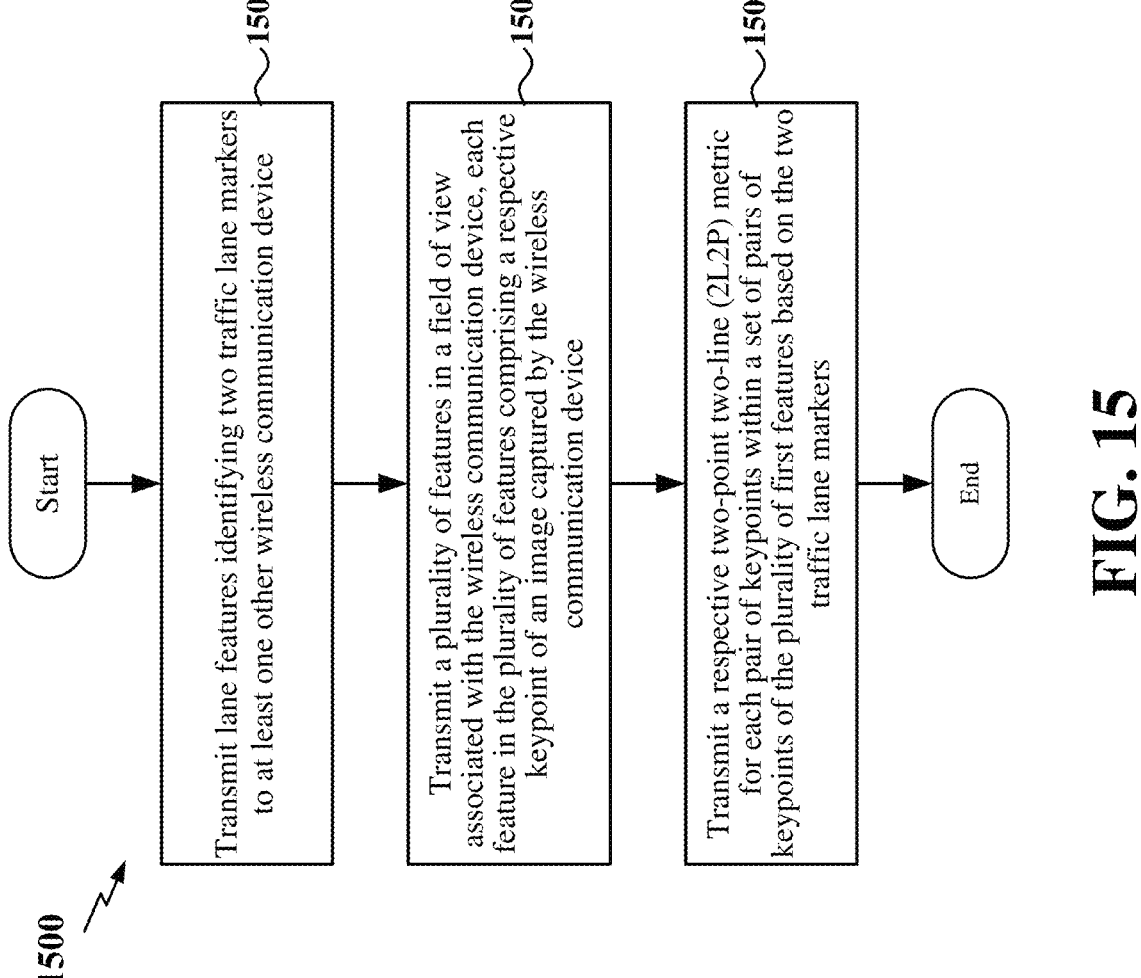
FIG. 15 is a flow chart of an exemplary process for visual feature sharing according to some aspects.

FIG. 15 is a flow chart of an exemplary process 1500 for visual feature sharing according to some aspects As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1502, the wireless communication device may transmit lane features identifying two traffic lane markers to at least one other wireless communication device. In some examples, the lane features include one or more of a lane marker color, a type of lane marker, or an order in which lane markers are viewed based on a rule. For example, the communication and processing circuitry 1242, together with the visual feature sharing circuitry 1244 and transceiver 1210, shown and described above in connection with FIG. 12, may provide a means to transmit the lane sharing features.

At block 1504, the wireless communication device may transmit a plurality of features in a field of view associated with the wireless communication device, in which each feature in the plurality of features includes a respective keypoint of an image captured by the wireless communication device. In some examples, each feature in the plurality of features further includes a respective feature descriptor corresponding to the respective keypoint. In some examples, the plurality of features include corner point features of at least one additional traffic lane marker excluded from the two traffic lane markers. For example, the at least one additional traffic lane marker may include a broken lane marker. In some examples, the plurality of features lie in a space between a pair of traffic lane markers. In this example, the wireless communication device may further transmit an indication of the pair of traffic lane markers to at least one other wireless communication device. In some examples, the pair of traffic lane markers may include at least one of the two traffic lane markers. The communication and processing circuitry 1242, together with the visual feature sharing circuitry 1244 and transceiver 1210, shown and described above in connection with FIG. 12, may provide a means to transmit the plurality of features.

At block 1506, the wireless communication device may transmit a respective two-point two-line (2L2P) metric for each pair of keypoints within a set of pairs of keypoints of the plurality of features based on the two traffic lane markers. In some examples, the wireless communication device may further receive a request for respective additional 2L2P metrics associated with additional pairs of keypoints outside the set of pairs of keypoints from the at least one other wireless communication device. The wireless communication device may further transmit the respective additional 2L2P metrics to the at least one other wireless communication device. In some examples, the request includes a preferred keypoint to be included in each of the additional pairs of first keypoints for the respective additional 2L2P metrics. In some examples, the respective additional 2L2P metrics use the preferred keypoint, the two traffic lane markers and an additional traffic lane marker as a basis. In some examples, each of the additional pairs of keypoints includes the preferred keypoint and a respective other first keypoint within a subset of the plurality of features. In some examples, the request includes the additional pairs of keypoints for which the respective additional 2L2P metrics are requested. In some examples, each of the additional pairs of keypoints includes other keypoints excluded from the plurality of features. In this example, the wireless communication device may further transmit the additional 2L2P metrics and an indication of each of the other keypoints comprising a respective keypoint descriptor associated therewith.

In one configuration, the wireless communication device 1200 includes means for transmitting lane features identifying two traffic lane markers to at least one other wireless communication device, means for transmitting a plurality of features in a field of view associated with the wireless communication device, each feature in the plurality of features comprising a respective keypoint of an image captured by the wireless communication device, and means for transmitting a respective two-point two-line (2L2P) metric for each pair of keypoints within a set of pairs of keypoints of the plurality of features based on the two traffic lane markers. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3, 6, and/or 9, and utilizing, for example, the processes and/or algorithms described herein in relation to FIGS. 11 and 15.

The processes and/or algorithms shown in FIGS. 13-15 may include additional aspects, such as any single aspect or any combination of aspects described below and/or in connection with one or more other processes described elsewhere herein.

Aspect 1: A method operable at a first wireless communication device, the method comprising: receiving lane features identifying two traffic lane markers from a second wireless communication device; receiving a plurality of first features in a first field of view associated with the second wireless communication device, each first feature in the plurality of first features comprising a respective first keypoint of a first image captured by the second wireless communication device; receiving a respective two-point two-line (2L2P) metric for each pair of first keypoints within a set of pairs of first keypoints of the plurality of first features based on the two traffic lane markers from the second wireless communication device; obtaining a plurality of second features in a second field of view associated with the first wireless communication device, each second feature in the plurality of second features comprising a respective second keypoint of a second image captured by the first wireless communication device; associating the plurality of first features with the plurality of second features to obtain a set of corresponding keypoints within the plurality of second features that correspond to respective first keypoints within the plurality of first features; identifying matching keypoints within the set of corresponding keypoints for which the respective 2L2P metric is satisfied; and calculating a relative pose of the first wireless communication device with respect to the second wireless communication device based on the matching keypoints.

Aspect 2: The method of aspect 1, wherein each first feature in the plurality of first features further comprises a respective first feature descriptor corresponding to the respective first keypoint, and each second feature in the plurality of second features further comprises a respective second feature descriptor corresponding to the respective second keypoint, and wherein the associating the plurality of first features with the plurality of second features further comprises: associating the plurality of first features with the plurality of second features based on the first keypoints, the second keypoints, the first feature descriptors, and the second feature descriptors.

Aspect 3: The method of aspect 1 or 2, wherein the lane features comprise one or more of a lane marker color, a type of lane marker, or an order in which lane markers are viewed based on a rule.

Aspect 4: The method of any of aspects 1 through 3, wherein the set of pairs of first keypoints comprise corner point features of at least one additional traffic lane marker excluded from the two traffic lane markers.

Aspect 5: The method of aspect 4, wherein the at least one additional traffic lane marker comprises a broken lane marker.

Aspect 6: The method of any of aspects 1 through 5, wherein the set of pairs of first keypoints lie in a space between a pair of traffic lane markers, and further comprising: receiving an indication of the pair of traffic lane markers from the second wireless communication device.

Aspect 7: The method of aspect 6, wherein the pair of traffic lane markers comprises at least one of the two traffic lane markers.

Aspect 8: The method of aspect 1, further comprising: transmitting a request for respective additional 2L2P metrics associated with additional pairs of first keypoints outside the set of pairs of first keypoints in response to a number of the matching keypoints being below a threshold; receiving the respective additional 2L2P metrics from the second wireless communication device; and identifying additional matching keypoints for which the additional respective 2L2P metric is satisfied to calculate the relative pose.

Aspect 9: The method of aspect 8, wherein the request comprises a preferred keypoint of the matching keypoints, the preferred keypoint being included in each of the additional pairs of first keypoints for the respective additional 2L2P metrics.

Aspect 10: The method of aspect 9, wherein the respective additional 2L2P metrics use the preferred keypoint, the two traffic lane markers and an additional traffic lane marker as a basis.

Aspect 11: The method of aspect 10, wherein each of the additional pairs of first keypoints comprises the preferred keypoint and a respective other first keypoint within a subset of the plurality of first features, and wherein the identifying the additional matching points further comprising: identifying the additional matching points for which the additional 2L2P metrics are satisfied without receiving an indication of the respective other first keypoints from the second wireless communication device.

Aspect 12: The method of aspect 8, wherein the request comprises the additional pairs of first keypoints for which the respective additional 2L2P metrics are requested.

Aspect 13: The method of aspect 8, wherein each of the additional pairs of first keypoints comprises other first keypoints excluded from the plurality of first features, and wherein the receiving the respective additional 2L2P metrics further comprises: receiving the additional 2L2P metrics and an indication of each of the other first keypoints and a respective keypoint descriptor associated therewith.

Aspect 14: A method operable at a wireless communication device, the method comprising: transmitting lane features identifying two traffic lane markers to at least one other wireless communication device; transmitting a plurality of features in a field of view associated with the wireless communication device, each feature in the plurality of features comprising a respective keypoint of an image captured by the wireless communication device; and transmitting a respective two-point two-line (2L2P) metric for each pair of keypoints within a set of pairs of keypoints of the plurality of features based on the two traffic lane markers.

Aspect 15: The method of aspect 14, wherein each feature in the plurality of features further comprises a respective feature descriptor corresponding to the respective keypoint.

Aspect 16: The method of aspect 14 or 15, wherein the lane features comprise one or more of a lane marker color, a type of lane marker, or an order in which lane markers are viewed based on a rule.

Aspect 17: The method of any of aspects 14 through 16, wherein the plurality of features comprise corner point features of at least one additional traffic lane marker excluded from the two traffic lane markers.

Aspect 18: The method of aspect 17, wherein the at least one additional traffic lane marker comprises a broken lane marker.

Aspect 19: The method of any of aspects 14 through 18, wherein the plurality of features lie in a space between a pair of traffic lane markers, and further comprising: transmitting an indication of the pair of traffic lane markers to at least one other wireless communication device.

Aspect 20: The method of aspect 19, wherein the pair of traffic lane markers comprises at least one of the two traffic lane markers.

Aspect 21: The method of any of aspects 14 through 20, further comprising: receiving a request for respective additional 2L2P metrics associated with additional pairs of keypoints outside the set of pairs of keypoints from the at least one other wireless communication device; and transmitting the respective additional 2L2P metrics to the at least one other wireless communication device.

Aspect 22: The method of aspect 21, wherein the request comprises a preferred keypoint, the preferred keypoint being included in each of the additional pairs of first keypoints for the respective additional 2L2P metrics.

Aspect 23: The method of aspect 22, wherein the respective additional 2L2P metrics use the preferred keypoint, the two traffic lane markers and an additional traffic lane marker as a basis.

Aspect 24: The method of aspect 23, wherein each of the additional pairs of keypoints comprises the preferred keypoint and a respective other first keypoint within a subset of the plurality of features.

Aspect 25: The method of aspect 21, wherein the request comprises the additional pairs of keypoints for which the respective additional 2L2P metrics are requested.

Aspect 26: The method of aspect 21, wherein each of the additional pairs of keypoints comprises other keypoints excluded from the plurality of features, and wherein the transmitting the respective additional 2L2P metrics further comprises: transmitting the additional 2L2P metrics and an indication of each of the other keypoints comprising a respective keypoint descriptor associated therewith.

Aspect 27: A wireless communication device comprising a transceiver, a memory, and a processor coupled to the transceiver and the memory, the processor configured to perform a method of any one of aspects 1 through 13 or 14 through 26.

Aspect 28: A wireless communication device comprising means for performing a method of any one of aspects 1 through 13 or 14 through 26.

Aspect 29: A non-transitory computer-readable medium having stored therein instructions executable by one or more processors of a wireless communication device to perform a method of any one of aspects 1 through 13 or 14 through 26.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 6, 9, and/or 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication device, comprising:
a transceiver;
one or more memories; and
one or more processors coupled to the transceiver and the one or more memories, the one or more processors being configured to:
transmit lane features identifying two traffic lane markers to at least one other wireless communication device via the transceiver;
transmit a plurality of features in a field of view associated with the wireless communication device via the transceiver, each feature in the plurality of features comprising a respective keypoint of an image captured by the wireless communication device;
transmit a respective invariant two-point two-line (2L2P) metric for each pair of keypoints within a set of pairs of keypoints of the plurality of features based on the two traffic lane markers via the transceiver;
receive a request for respective additional 2L2P metrics associated with additional pairs of keypoints outside the set of pairs of keypoints from the at least one other wireless communication device, wherein the request comprises a preferred keypoint, the preferred keypoint being included in each of the additional pairs of keypoints for the respective additional 2L2P metrics; and
transmit the respective additional 2L2P metrics to the at least one other wireless communication device.

2. The wireless communication device of claim 1, wherein each feature in the plurality of features further comprises a respective feature descriptor corresponding to the respective keypoint.

3. The wireless communication device of claim 1, wherein the lane features comprise one or more of a lane marker color, a type of lane marker, or an order in which lane markers are viewed based on a rule.

4. The wireless communication device of claim 1, wherein the plurality of features comprise corner point features of at least one additional traffic lane marker excluded from the two traffic lane markers.

5. The wireless communication device of claim 4, wherein the at least one additional traffic lane marker comprises a broken lane marker.

6. The wireless communication device of claim 1, wherein the plurality of features lie in a space between a pair of traffic lane markers, and wherein the one or more processors are further configured to:
transmit an indication of the pair of traffic lane markers to at least one other wireless communication device.

7. The wireless communication device of claim 6, wherein the pair of traffic lane markers comprises at least one of the two traffic lane markers.

8. The wireless communication device of claim 1, wherein the respective additional 2L2P metrics use the preferred keypoint, the two traffic lane markers and an additional traffic lane marker as a basis.

9. The wireless communication device of claim 8, wherein each of the additional pairs of keypoints comprises the preferred keypoint and a respective other first keypoint within a subset of the plurality of features.

10. A method operable at a wireless communication device, the method comprising:
transmitting lane features identifying two traffic lane markers to at least one other wireless communication device;
transmitting a plurality of features in a field of view associated with the wireless communication device, each feature in the plurality of features comprising a respective keypoint of an image captured by the wireless communication device;
transmitting a respective invariant two-point two-line (2L2P) metric for each pair of keypoints within a set of pairs of keypoints of the plurality of features based on the two traffic lane markers;
receiving a request for respective additional 2L2P metrics associated with additional pairs of keypoints outside the set of pairs of keypoints from the at least one other wireless communication device, wherein the request comprises a preferred keypoint, the preferred keypoint being included in each of the additional pairs of keypoints for the respective additional 2L2P metrics; and
transmitting the respective additional 2L2P metrics to the at least one other wireless communication device.

11. The method of claim 10, wherein each feature in the plurality of features further comprises a respective feature descriptor corresponding to the respective keypoint.

12. The method of claim 10, wherein the respective additional 2L2P metrics use the preferred keypoint, the two traffic lane markers and an additional traffic lane marker as a basis.

13. The method of claim 10, wherein each of the additional pairs of keypoints comprises the preferred keypoint and a respective other first keypoint within a subset of the plurality of features.

* * * * *